US009591303B2

(12) United States Patent
Ramasubramonian et al.

(10) Patent No.: US 9,591,303 B2
(45) Date of Patent: Mar. 7, 2017

(54) RANDOM ACCESS AND SIGNALING OF LONG-TERM REFERENCE PICTURES IN VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Rajan Laxman Joshi, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 13/784,006

(22) Filed: Mar. 4, 2013

(65) Prior Publication Data

US 2014/0003537 A1    Jan. 2, 2014

Related U.S. Application Data

(60) Provisional application No. 61/665,862, filed on Jun. 28, 2012, provisional application No. 61/666,688, filed on Jun. 29, 2012.

(51) Int. Cl.
| | | |
|---|---|---|
| H04N 19/00 | (2014.01) | |
| H04N 19/44 | (2014.01) | |
| H04N 19/70 | (2014.01) | |
| H04N 19/172 | (2014.01) | |
| H04N 19/61 | (2014.01) | |
| H04N 19/103 | (2014.01) | |
| H04N 19/107 | (2014.01) | |
| H04N 19/157 | (2014.01) | |

(52) U.S. Cl.
CPC ..... *H04N 19/00533* (2013.01); *H04N 19/103* (2014.11); *H04N 19/107* (2014.11); *H04N 19/157* (2014.11); *H04N 19/172* (2014.11); *H04N 19/61* (2014.11); *H04N 19/70* (2014.11)

(58) Field of Classification Search
CPC .. H04N 7/50; H04N 7/26335; H04N 7/26707; H04N 7/26946; H04N 7/26244
See application file for complete search history.

(56) References Cited

U.S. PATENT DOCUMENTS

| | | |
|---|---|---|
| 2009/0220012 A1 | 9/2009 | Rodriguez et al. |
| 2009/0238268 A1 | 9/2009 | Hsu et al. |
| 2010/0122311 A1 | 5/2010 | Rodriguez et al. |

(Continued)

FOREIGN PATENT DOCUMENTS

| | | |
|---|---|---|
| TW | 200942045 A | 10/2009 |
| TW | 201032597 A | 9/2010 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.

(Continued)

*Primary Examiner* — Frank Huang
(74) *Attorney, Agent, or Firm* — Shumaker & Sieffert, P.A.

(57) ABSTRACT

A video coder can be configured to code a random access point (RAP) picture and code one or more decodable leading pictures (DLPs) for the RAP picture such that all pictures that are targeted for discard precede the DLPs associated with the RAP picture in display order.

57 Claims, 11 Drawing Sheets

(56) References Cited

U.S. PATENT DOCUMENTS

| | | |
|---|---|---|
| 2010/0189182 A1 | 7/2010 | Hannuksela |
| 2011/0019977 A1 | 1/2011 | Ryu et al. |
| 2011/0064146 A1 | 3/2011 | Chen et al. |
| 2014/0003537 A1* | 1/2014 | Ramasubramonian et al. ............ 375/240.25 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Hendry et al., "Undiscardable Leading Picture for CRA," Document: JCTVC-G158, 7th Meeting, Geneva, CH, Nov. 21-30, 2011, 7 pp.

International Search Report and Written Opinion—PCT/US2013/046529—ISA/EPO—Aug. 27, 2013, 11 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, Jun. 2011, 674 pp.

Sullivan, "CRA pictures with broken links," Document: JCTVC-I0404, 9th Meeting, Geneva, CH, Apr. 27-May 7, 2012, 3 pp.

Wang, et al., "On reference picture set," Document: JCTVC-I0342, 9th Meeting, Geneva, CH, Apr. 27-May 7, 2012, 6 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion from International Application No. PCT/US2013/046529, dated Jul. 9, 2014, 7 pp.

International Preliminary Report on Patentability from International Application No. PCT/US2013/046529, dated Oct. 12, 2014, 25 pp.

* cited by examiner

RANDOM ACCESS AND SIGNALING OF LONG-TERM REFERENCE PICTURES IN VIDEO CODING

This application claims the benefit of

U.S. Provisional Application No. 61/665,862, filed 28 Jun. 2012, and

U.S. Provisional Application No. 61/666,688 filed 29 Jun. 2012, each of which is hereby incorporated by reference in their entirety.

TECHNICAL FIELD

This disclosure generally relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. A recent draft of the upcoming HEVC standard, referred to as "HEVC Working Draft 7," or "WD7," is described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, 27 Apr. 2012 to 7 May 2012, which, as of 5 Feb. 2013, is downloadable from http://phenix.it-sudparis.eu/jct/doc_end_user/documents/9_Geneva/wg11/JCTVC-I1003-v5.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for supporting random access and signaling of long-term reference pictures in video coding. This disclosure proposes several restrictions for supporting random access based on various types of pictures. In one example, all tagged for discard (TFD) pictures for a random access point (RAP) picture may have a display order value that is earlier than the display order value for all decodable leading pictures (DLPs) for the RAP. This disclosure also proposes a restriction in which interleaving of leading pictures with "trailing pictures" in decoding order is prevented. That is, in accordance with the techniques of this disclosure, video coders may ensure that all leading pictures (including both TFD pictures and DLPs) have decoding order values earlier than decoding order values of pictures that have both display order values greater than the display order value of the corresponding RAP picture and decoding order values greater than the decoding order values of the corresponding RAP picture. Display order may also be referred to as output order. TFD pictures may also be referred to as random access skipped leading (RASL) pictures, and DLP pictures may also be referred to as random access decodable leading (RADL) pictures.

In one example, a method of coding video data includes coding a random access point (RAP) picture; and coding one or more decodable leading pictures (DLPs) for the RAP picture such that all pictures that are targeted for discard precede the DLPs associated with the RAP picture in display order.

In another example, a device for coding video data includes a video coder configured to code a random access point (RAP) picture; and code one or more decodable leading pictures (DLPs) for the RAP picture such that all pictures that are targeted for discard precede the DLPs associated with the RAP picture in display order.

In another example, an apparatus for coding video data, includes means for coding a random access point (RAP) picture; and means for coding one or more decodable leading pictures (DLPs) for the RAP picture such that all pictures that are targeted for discard precede the DLPs associated with the RAP picture in display order.

In another example, a computer readable storage medium storing instructions that when executed by one or more processors cause the one or more processors to code a random access point (RAP) picture; and code one or more decodable leading pictures (DLPs) for the RAP picture such that all pictures that are targeted for discard precede the DLPs associated with the RAP picture in display order.

In another example, a method of encoding video data includes encoding a random access point (RAP) picture and encoding one or more decodable leading pictures (DLPs) for the RAP picture such that all pictures that are targeted for discard precede the DLPs associated with the RAP picture in display order.

In another example, a device for encoding video data includes a video encoder configured to encode a random access point (RAP) picture; and encode one or more decodable leading pictures (DLPs) for the RAP picture such that all pictures that are targeted for discard precede the DLPs associated with the RAP picture in display order.

In another example, an apparatus for encoding video data includes means for encoding a random access point (RAP) picture and means for encoding one or more decodable leading pictures (DLPs) for the RAP picture such that all pictures that are targeted for discard precede the DLPs associated with the RAP picture in display order.

In another example, a computer readable storage medium stores instructions that when executed by one or more processors cause the one or more processors to encode a random access point (RAP) picture; and encode one or more decodable leading pictures (DLPs) for the RAP picture such that all pictures that are targeted for discard precede the DLPs associated with the RAP picture in display order.

The details of one or more examples are set forth in the accompanying drawings and the description below. Other features, objects, and advantages will be apparent from the description and drawings, and from the claims.

DETAILED DESCRIPTION

Figure 1:
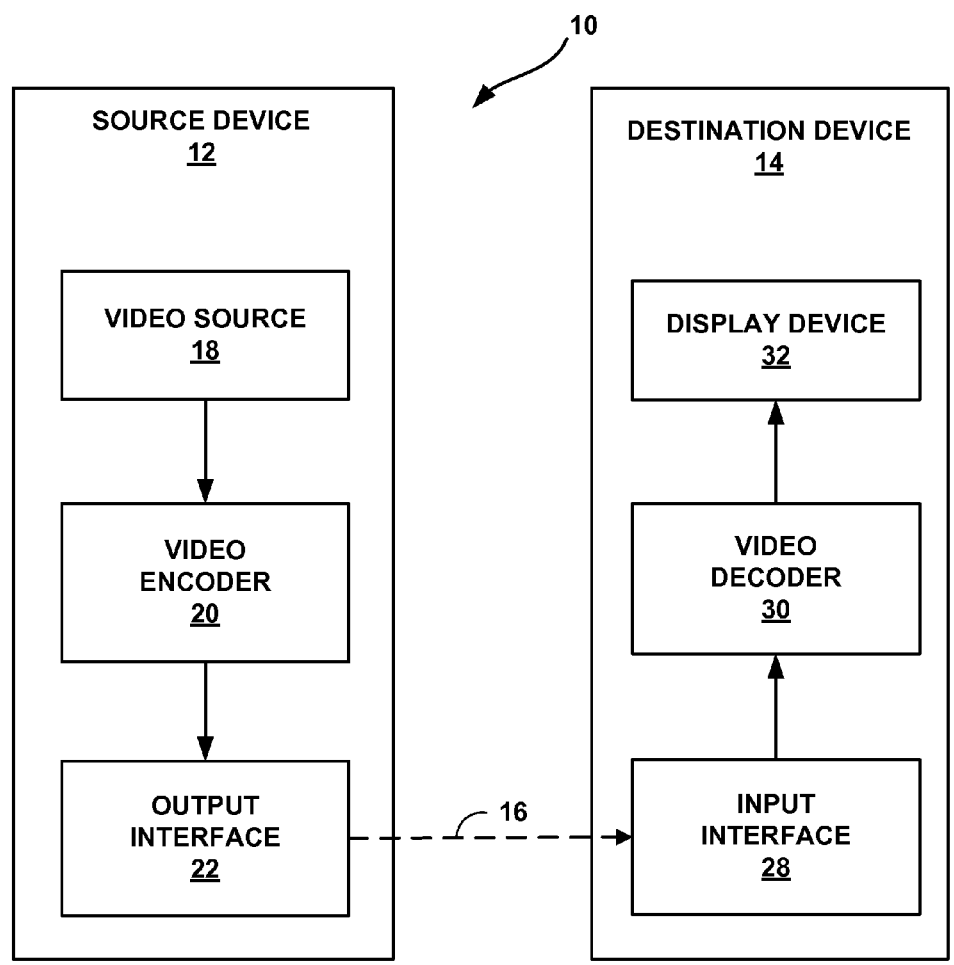
FIG. 1 is a block diagram illustrating an example video encoding and decoding system that may utilize techniques for signaling long-term reference pictures in slice headers.

In general, video data is represented by a sequence of pictures that are captured or displayed in rapid succession. It should be understood that in some examples, pictures or portions of the pictures may be generated, e.g., using computer graphics, rather than (or in addition to) being captured. The order in which the pictures are to be displayed (which may or may not be the same as the order in which the pictures were captured or generated) may differ from an order in which the coded pictures are included in the bitstream. The display order of pictures within a coded video sequence may be represented by picture order count (POC) values, while the coding order of pictures may be represented by frame number (frame_num) values.

Coding of pictures generally involves taking advantage of redundant data occurring in the pictures. For example, spatial coding, also referred to as intra-predictive coding, takes advantage of redundancies occurring between spatially neighboring blocks of pixel values of a common picture. As another example, temporal coding, also referred to as inter-predictive coding, takes advantage of redundancies occurring between different pictures that are captured, generated, or displayed at different temporal instances. More particularly, a picture may be divided into slices, which may be designated for intra- or inter-prediction. Moreover, each slice may be divided into blocks (e.g., largest coding units (LCUs), also referred to as coding tree units), and each of the blocks may be either further partitioned or coded based on whether the corresponding slice has been designated for intra- or inter-prediction.

With respect to the example of inter-predictive coding, blocks of a picture currently being coded (also referred to as a "current picture") may be predicted from a reference picture. WD7 defines a "reference picture" as a picture with a nal_ref_flag equal to 1. The nal_ref_flag is a syntax element of a network abstraction layer (NAL) unit indicating whether data included in the NAL unit is to be treated as a reference picture. WD7 also provides that a reference picture contains samples (that is, pixel values) that may be used for inter-prediction in the decoding process of subsequent pictures in decoding order.

As introduced above, in general, video data includes various types of pictures. For example, video data includes random access points (RAPs) that can be used to begin a stream of video data. RAPs are pictures that are independently coded, e.g., as intra-prediction coded pictures (I-pictures). RAPs include instantaneous decoder refresh (IDR) pictures, broken link access (BLA) pictures, clean random access (CRA) pictures, and gradual decoding refresh (GDR) pictures. Other types of pictures include pictures that are targeted for discard (TFD), decodable leading pictures (DLPs), and trailing pictures. In general, DLPs (like all leading pictures) are pictures that have an output order that is earlier than an output order of a corresponding RAP, but a decoding order that is later than the decoding order of the corresponding RAP. However, DLPs are leading pictures that are decodable without retrieving data that precedes the corresponding RAP in decoding order. Trailing pictures, on the other hand, have an output order that is later than the output order of the corresponding RAP as well as a decoding order that is later than the decoding order of the corresponding RAP. Pictures that are TFD cannot be properly decoded when performing random access from a corresponding RAP. This is generally due to a TFD picture being predicted from data that precedes the corresponding RAP in decoding order. As random access from a RAP omits retrieving data earlier than the RAP in decoding order, TFD pictures, which depend on data earlier than the RAP in decoding order, are not correctly decodable when the RAP is used as a random access point, and may therefore be discarded without being decoded. TFD pictures "depend" on earlier data in the sense that they are predicted relative to one or more pictures occurring earlier in the decoding order than the RAP.

NAL units may be assigned particular NAL unit type values, e.g., in a NAL unit header, to indicate the type of data included in the corresponding NAL unit. NAL units may generally include video coding layer (VCL) data, also referred to as VCL NAL units, or non-VCL data, also referred to as non-VCL NAL units. Non-VCL data include, for example, parameter sets such as picture parameter sets (PPSs), sequence parameter sets (SPSs), and adaptation parameters sets (APSs), as well as supplemental enhancement information (SEI) messages. VCL data generally include coded video data. The NAL unit type may provide an indication of a type of data included in the NAL unit, including whether coded video data in the NAL unit correspond to a RAP, and if so, whether the coded video data correspond to a CRA, BLA, or IDR picture. The NAL unit type may indicate whether the NAL unit includes other types of data as well. Table 1 below provides an example of some NAL unit type values and data included in a corresponding NAL unit, as was provided in WD7:

TABLE 1

| nal_unit_type | Content of NAL unit and RBSP syntax structure | NAL unit type class |
|---|---|---|
| 1 | Coded slice of a non-RAP, non-TFD and non-TLA picture slice_layer_rbsp( ) | VCL |
| 2 | Coded slice of a TFD picture slice_layer_rbsp( ) | VCL |
| 3 | Coded slice of a non-TFD TLA picture slice_layer_rbsp( ) | VCL |
| 4, 5 | Coded slice of a CRA picture slice_layer_rbsp( ) | VCL |
| 6, 7 | Coded slice of a BLA picture slice_layer_rbsp( ) | VCL |
| 8 | Coded slice of an IDR picture slice_layer_rbsp( ) | VCL |

Moreover, WD7 distinguishes long-term reference pictures from short-term reference pictures. For example, WD7 defines a long-term reference picture as a reference picture that is marked as "used for long-term reference." WD7 provides that a flag in a sequence parameter set (SPS) indicates whether long-term reference pictures are signaled at all for a coded video sequence. In accordance with WD7, video coders signal least significant bits (LSBs) of POC values of long-term reference pictures in slice headers of slices. Signaling the LSBs may result in bit savings, relative to signaling the full POC value. Video coders, in accordance with WD7, may signal the most significant bits (MSBs) of the POC values of a long-term reference picture if there is more than one reference picture in a decoded picture buffer (DPB) that has the same LSB bits as the long-term reference picture. Moreover, in accordance with WD7, video coders may use a flag to indicate whether the signaled long-term reference pictures may be used by a current picture for reference.

One assumption for the reference picture set (RPS) design of HEVC is that the RPS derivation must be robust to picture losses, as long as relative POC values can be correctly established, for both short-term reference pictures (STRPs) and long-term reference pictures (LTRPs). To accomplish this, the RPS derivation for any picture may be self-contained, i.e., not depending on the decoded picture buffer (DPB) status. With this design principle, the STRPs, in accordance with WD7, are signaled using their delta POC values, with respect to the current picture. Hence, the decoder may be able to derive the POC values of these reference pictures even when some pictures were lost and hence check whether each of the STRPs is present.

This disclosure recognizes certain problems in the current slice header signaling of LTRPs in the presence of picture losses of WD7. Erroneous derivation of RPS is possible in the presence of losses. This is due to signaling only the amount of POC LSBs for the LTRPs that is the same as for signaling of the POC value for each current picture (i.e., pic_order_cnt_lsb), though in some cases the full POC values using the delta_poc_msb_cycle_lt syntax element are signaled for the LTRPs. If there is a picture in the DPB which has the same LSB as that signaled for the LTRP, then there could be ambiguity in the derivation of RPS, and incorrect result of RPS could occur, as shown in the examples presented below. In the examples discussed below, "MaxPicOrderCntLsb" is assumed to be equal to 256, or in other words, log2_max_pic_order_cnt_lsb_minus4 equals 4.

As a first example to illustrate the problems discussed above, consider three pictures n−1, n, and n+1, that are successive in decoding order. Assume that picture n−1 has reference pictures with POC values of 0 and 256 as LTRPs, and pictures n and n+1 only have a reference picture with POC 256 as the LTRP. The POC values of pictures n−1, n, and n+1 are all in the range of 257 to 511, inclusive. Also assume that none of the pictures n−1, n, and n+1 or any other picture in the DPB has LSB value equal to 0. Under the signaling of HEVC WD7, the relevant syntax elements of a conforming bitstream is as shown in Table 2.

TABLE 2

| POC (in decoding order) | LTRPs | LTRP LSBs | delta_poc_msb_present_flag | delta_poc_msb_cycle_lt |
|---|---|---|---|---|
| ... | ... | ... | ... | ... |
| n − 1 | 0, 256 | 0, 0 | 1, 1 | 1, 0 |
| n | 256 | 0 | 1 | 0 |
| n + 1 | 256 | 0 | 0 | — |
| ... | ... | ... | ... | ... |

For picture n, even though only picture 256 is signaled as the LTRP, when the RPS of picture n is derived, picture 0 would still be in the DPB. Hence, even for picture n, delta_poc_msb_present_flag is set to 1, and the delta_poc_msb_msb_cycle_lt value is sent. After RPS derivation for picture n, picture 0 is marked as "unused for reference" and may be removed from the DPB. For picture n+1, however, since only one LTRP is present in the DPB, delta_poc_msb_present_flag is set to 0 and delta_poc_msb_cycle_lt is not present.

Under the syntax structure of WD7, the above table will correspond to a conforming bitstream. However, if picture n is lost, then the LTRP signaling for picture n+1 would be insufficient to resolve which picture from the DPB is to be picked as the LTRP. Both 0 and 256 have LSB of 0, and the decoder would not be able to resolve the issue. The decoder would need the delta_poc_msb_present_flag to be equal to 1 for picture n+1 to uniquely identify the picture to be used as the only LTRP.

A second example of the problems discussed above, related to the first example above, is as follows. The description of Table 3 is similar to the description of Table 2, with the exception that picture 0 is signaled as LTRP and picture 256 is signaled as STRP for picture n−1.

TABLE 3

| POC (in decoding order) | LTRPs | STRPs | LTRP LSBs | delta_poc_msb_present_flag | delta_poc_msb_cycle_lt |
|---|---|---|---|---|---|
| ... | ... | ... | ... | ... | ... |
| n − 1 | 0 | 256 | 0 | 1 | 1 |
| n | 256 | — | 0 | 1 | 0 |
| n + 1 | 256 | — | 0 | 0 | — |
| ... | ... | ... | ... | ... | ... |

Here again, if picture n is lost, the decoder would not be able to correctly identify that the LTRP signaled as picture 256, and the decoder would need the delta_poc_msb_present_flag to be equal to 1 to uniquely identify the picture to be used as the only LTRP.

A third example of the problems discussed above is described with respect to Table 4.

TABLE 4

| POC (in decoding order) | LTRPs | STRP | LTRP LSBs | delta_poc_msb_present_flag | delta_poc_msb_cycle_lt |
|---|---|---|---|---|---|
| ... | ... | ... | ... | ... | ... |
| 255 | 0 | — | 0 | 0 | ... |
| 256 | 0 | — | 0 | 0 | |
| 257 | 256 | — | 0 | 1 | 0 |
| 258 | 256 | — | 0 | 0 | — |
| ... | ... | ... | ... | ... | ... |

With respect to the example of Table 4, suppose that a picture with POC 255 is received, followed by picture 258 (in other words, pictures 256 and 257 were lost). After decoding a slice header for picture 258, picture 0 (instead of picture 256) will be marked as a LTRP. Rather than figuring out that the reference picture 256 is not present for picture 258, the decoder would incorrectly derive that picture 0 is the LTRP signaled and continue decoding (provided other aspects of the decoding process work for this loss).

From the above examples, a deceptively simple solution for solving the above problems may appear to be to signal the actual full POC value of the LTRPs. It would also seem that the RPS derivation would be self-contained with full POC signaling. However, the possibility that CRA pictures may either start a bitstream, or that the CRA pictures may be converted into a BLA picture by a splicer rules out signaling the full POC value. For example, consider a CRA picture in a bitstream with a POC value of 256 (still assuming MaxPicOrderCntLsb=256), and let some pictures that follow the CRA picture in decoding order have the CRA picture as an LTRP. If the full POC of the CRA picture, which is 256, is signaled, and the CRA picture is converted into a BLA picture or starts a bitstream, then the LTRP would be incorrectly derived, and the bitstream will become non-conforming. When a CRA picture is converted to a BLA picture or starts a bitstream, the decoder derives its POC value only on the basis of its LSB, in accordance with the techniques of WD7. In the above example, the POC of the CRA picture (which is now a BLA picture) will be determined to be 0. When a decoder looks for an LTRP with POC 256, the DPB will not contain any such picture because now the CRA picture has derived POC of 0. This would result in a "no reference picture" in the RPS, and if current picture is not a TFD picture associated with the CRA picture, the resulting bitstream would be non-conforming.

This disclosure describes techniques for supporting random access for video data. In some instances, these techniques may be used to overcome the above problems of WD7. More particularly, this disclosure proposes several restrictions for supporting random access based on various types of pictures. First, according to one technique of this disclosure, all TFD pictures for a RAP picture should have a display order value that is earlier than the display order value for all DLPs for the RAP. This restriction may improve a viewer's viewing experience by avoiding choppiness in the frame rate. That is, if there are one or more pictures that cannot be correctly decoded (i.e., TFD pictures) and if these pictures had display order values intermingled with the DLPs, the frame rate would appear choppy, which would diminish user experience. According to another technique, this disclosure also proposes a restriction in which interleaving of leading pictures with "trailing pictures" in decoding order is prevented. That is, in accordance with the techniques of this disclosure, video coders may ensure that all leading pictures (including both TFD pictures and DLPs) have decoding order values earlier than decoding order values of pictures that have display order values greater than the display order value of the corresponding RAP picture. As noted above, "trailing pictures" are pictures that follow the RAP picture in both decoding order and in display order.

As introduced above, in general, video data includes various types of pictures. For example, video data includes RAPs that can be used to begin a stream of video data. RAPs are pictures that are independently coded, e.g., as intraprediction coded pictures (I-pictures). RAPs include IDR pictures, BLA pictures and CRA pictures.

Other types of pictures include TFD, DLPs, and trailing pictures. In general, DLPs (like all leading pictures) are pictures that have an output order that is earlier than an output order of the corresponding RAP picture, but a decoding order that is later than the decoding order of the corresponding RAP. However, DLPs are leading pictures that are decodable without retrieving data that precede the corresponding RAP picture in decoding order. In other words, DLPs are leading pictures that are predicted relative to data of one or more pictures including and/or following the corresponding RAP. Trailing pictures, on the other hand, have an output order that is later than the output order of the corresponding RAP as well as a decoding order that is later than the decoding order of the corresponding RAP picture.

Pictures that are TFD pictures cannot be properly decoded when performing random access from the corresponding RAP picture. This is generally due to a TFD picture being predicted from data that precede the corresponding RAP picture in decoding order. Because random access from a RAP picture omits retrieving data earlier than the RAP picture, TFD pictures depending on data earlier than the RAP picture will not be correctly decodable, and may therefore be discarded without being decoded.

This disclosure proposes several restrictions for supporting random access based on these various types of pictures. First, all TFD pictures of a RAP picture should have a display order value that is earlier than the display order value for all DLPs of the RAP picture. This restriction may improve a viewer's viewing experience, because it avoids choppiness in the frame rate. That is, if there are one or more pictures that cannot be correctly decoded (such as TFD pictures), if these pictures had display order values intermingled with the DLPs, the frame rate would appear choppy, which would diminish user experience.

This disclosure also proposes a restriction in which interleaving of leading pictures with "trailing pictures" in decoding order is prevented. That is, in accordance with the techniques of this disclosure, video coders may ensure that all leading pictures (including both TFD pictures and DLPs) have decoding order values earlier than decoding order values of pictures that have display order values greater than the display order value of the corresponding RAP picture. As noted above, "trailing pictures" are pictures that follow the RAP picture in both decoding order and in display order. Implementing the techniques of this disclosure, a video encoder can be configured to encode a RAP picture and encode one or more DLPs for the RAP picture such that all pictures that are targeted for discard precede the DLPs associated with the RAP picture in output order. Likewise, a video decoder need not attempt to decode TFD pictures following a RAP picture that is used as a random access point. Instead, the video decoder may simply parse data for such TFD pictures, without attempting to decode the data. This may provide a resource savings for a device such as a video decoder. For example, these techniques may save battery power and/or improve processing efficiency. By not interleaving the leading and trailing pictures in decoding order, a system (such as a MANE or a video decoder) can easily identify leading pictures associated with the RAP picture, without having the need to parse beyond the first trailing picture that succeeds the associated RAP picture. Identifying leading pictures may be useful in deciding the output at random access because leading picture occur before the RAP in display order and may be useful for removing leading pictures if an intermediate system is configured to do so. Moreover, as noted above, these techniques may lead to an improved user experience by avoiding frame rate choppiness.

FIG. 1 is a block diagram illustrating an example video encoding and decoding system 10 that may utilize techniques for signaling long-term reference pictures in slice headers. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for signaling long-term reference pictures in slice headers. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for signaling long-term reference pictures in slice headers may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. Although this disclosure may at times rely on WD7 of HEVC for purposes of explanation, the techniques of this disclosure are in no way limited to WD7. The HEVC standard continues to evolve, and it is contemplated that the techniques of this disclosure can be compatible with future versions of HEVC. For example, the techniques in this disclosure may be used in conjunction with "HEVC Working Draft 10," or "WD10," which is described in document JCTVC-L1003_v18, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, 14-23 Jan. 2013, which, as of 5 Feb. 2013, is downloadable from http://phenix.it-sudparis.eu/jct/doc_end_user/documents/12_Geneva/wg11/JCTVC-L1003-v18.zip.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with the techniques of this disclosure, video encoder 20 and video decoder 30 may be configured to execute an example function "GetLSB(poc, len)," where poc is an integer and len is a positive integer, as follows.

$$GetLSB(poc, len) = poc - (1 << len) * \text{Floor}\left(\frac{poc}{1 << len}\right) \quad (1)$$

In the example of function (1), "<<" represents a bitwise left-shift operator and Floor( ) returns a value of the argument passed to it that is rounded down.

Video encoder 20 and video decoder 30 may be configured to perform one or more various techniques for derivation of reference picture sets (RPSs) and signaling of long-term reference pictures (LTRPs) to be included in the RPS of a coded picture. In general, video encoder 20 and video decoder 30 may be configured to perform any or all of the examples described in this disclosure, alone or in any combination. In general, this disclosure describes techniques related to the following encoding and decoding techniques, where video encoder 20 and video decoder 30 may be configured to perform any or all of these techniques in combination with other techniques of WD7 or other video coding frameworks.

In one example, the information signaled for a particular LTRP to be included in the RPS of the current picture may be the delta POC value, either between the current picture and the LTRP or between the LTRP and the previous RAP picture in decoding order. As one alternative, the LTRP signaling and derivation may remain the same as in WD7, except that the syntax element delta_poc_msb_cycle_lt[i] is always signaled for every LTRP in the slice header, either by removing the syntax element delta_poc_msb_present_flag [i], or by mandating that delta_poc_msb_present_flag[i] be 1 for all LTRPs. As another alternative, the information signaled for a particular LTRP to be included in the RPS of the current picture may either be the delta POC value between the LTRP and the previous RAP picture in decoding order, or the above alternative method may be applied.

In one alternative, pictures following a CRA or BLA picture in decoding order may be disallowed to use pictures preceding the CRA or BLA pictures in decoding order as LTRPs. Consequently, leading pictures may be disallowed to refer to pictures that precede the associated CRA or BLA picture, in decoding order, as LTRPs. For non-TFD pictures, the number of bits required to signal the LTRP LSB may be determined by the picture with the smallest POC which is not marked as TFD, and that precedes, in decoding order, the current picture, and succeeds, in decoding order, the previous RAP picture in decoding order inclusive of the previous RAP picture in decoding order. For TFD pictures, the number of bits required to signal the LTRP LSB may be determined by the picture with the smallest POC that precedes, in decoding order, the current picture, and succeeds, in decoding order, the previous RAP picture in decoding order inclusive of the previous RAP picture in decoding order.

In one alternative, the TFD pictures associated with a RAP picture may be disallowed to succeed, in decoding order, any DLP picture associated with the same RAP picture. For non-TFD pictures, the number of bits required to signal the LTRP LSB may be determined by the picture with the smallest POC which is not marked as a TFD picture, and that precedes the current picture, in decoding order, and succeeds, in decoding order, the previous RAP picture in decoding order, inclusive of the previous RAP picture in decoding order. For TFD pictures, the number of bits required to signal the LTRP LSB may be determined by the picture with the smallest POC that precedes, in decoding order, the current picture, and succeeds, in output order, the RAP before the previous RAP picture in decoding order inclusive of the RAP before previous RAP picture in decoding order.

In one alternative, the leading pictures associated with a CRA or BLA picture may be disallowed to refer to the associated CRA or BLA picture or other leading pictures associated with the same CRA or BLA picture as LTRPs. The number of bits required to signal the LTRP LSB may be determined by the RAP picture that precedes, in output order, the current picture.

In one alternative, the following constraint may be imposed. Any picture preceding a CRA or BLA picture in decoding order shall precede any DLP picture associated with the CRA or BLA picture in output order. Furthermore, the following constraint may also be imposed that any TFD picture associated with a CRA or BLA picture shall precede any DLP picture associated with the CRA or BLA picture in output order. These example constraints disallow cases wherein DLP pictures are interleaved, in output order, with TFD pictures or pictures earlier, in decoding order, than the associated CRA or BLA picture. In those cases, when random accessing or performing stream switching from the CRA or BLA picture, the beginning picture rate would be smaller than after the DLP pictures are output. In adaptation streaming with frequent stream switching, e.g., in dynamic adaptive streaming over HTTP (DASH) context, such fluctuation in picture rate may cause undesirable user experience. For a CRA or BLA picture, WD7 provided that there shall be no picture preceding the CRA or BLA picture in decoding order and following the CRA or BLA picture in output order. The inclusion for that restriction was for a similar reason.

In one alternative, leading pictures (more specifically, TFD pictures) associated with a first picture are allowed to use the DLP pictures associated with a second picture for inter prediction reference as STRPs or LTRPs, wherein the first picture is a CRA picture, the second picture is a CRA or BLA picture, and the second picture and the first pictures are two continuous RAP pictures in decoding order, with the first picture succeeding the second picture in decoding order. Such inter-prediction reference of DLP pictures by leading pictures can be enabled by allowing such DLP pictures to be present in the reference picture set of such leading pictures, and may allow more flexible and higher-efficiency coding of leading pictures. Accordingly, the definitions of CRA and BLA pictures may be changed to allow such inter prediction.

In one alternative, decoding-order interleaving of TFD pictures associated with a CRA or BLA picture and pictures succeeding the CRA or BLA picture in both decoding order and output order, i.e., trailing pictures of the CRA or BLA picture, may be disallowed. In other words, any TFD pictures associated with a CRA or BLA picture may be required to precede any trailing picture of the CRA or BLA picture, in decoding order.

Alternatively, decoding-order interleaving of leading pictures associated with a CRA or BLA picture and pictures succeeding the CRA or BLA picture in both decoding order and output order may be disallowed. In other words, any leading picture associated with a CRA or BLA picture may be required to precede any picture, in decoding order, that succeeds the CRA or BLA picture in both decoding order and output order.

The following examples of implementations provide further detail for the examples described above. It should be understood that the various techniques described in the example implementations may be used alone or in any combination.

A first example implementation provides a method for attempting to solve the error resilience problem and to make sure that RPS deviation is self-contained (i.e., not depending on the DPB status), and is at the same time problem-free when a random access is performed from a CRA picture or when a CRA picture is converted to a BLA picture. In this first example implementation, the information signaled for a particular LTRP to be included in the RPS of the current picture is the delta POC value, either between the current picture and the LTRP (mode 1) or between the LTRP and the previous RAP picture in decoding order (mode 2). This first example implementation is also aligned with the current RPS signaling and derivation for STRPs of WD7. Encoders, such as video encoder 20, may choose one of the two modes for each LTRP to be signaled that would result in less bits to be used. For example, if the LTRP is closer to the previous RAP in decoding order than the current picture in output/ display order distance, then video encoder 20 may be configured to use mode 2. Otherwise, video encoder 20 may use mode 1. Likewise, video decoder 30 may receive syntax data describing the mode to use, and use the mode signaled by the syntax data.

To achieve the first example implementation, the following syntax, semantics, and coding process changes, relative to WD7, may be used, where underlined text represents a change relative to WD7. Table 5 below provides an example set of syntax for a picture parameter set (PPS).

TABLE 5

| pic_parameter_set_rbsp( ) { | Descriptor |
|---|---|
| pic_parameter_set_id | ue(v) |
| ... | |
| num_ref_idx_l0_default_active_minus1 | ue(v) |
| num_ref_idx_l1_default_active_minus1 | ue(v) |
| poc_lt_idc | u(2) |
| ... | |
| rbsp_trailing_bits( ) | |
| } | |

In this first example implementation, as shown in Table 5, the PPS syntax includes an additional syntax element, poc_lt_idc, relative to WD7. The semantics for other syntax elements may remain the same. In this example, poc_lt_idc may be used to indicate the presence of delta_poc_lt_curr_pic_flag[i] in the slice header, and, when delta_poc_lt_curr_pic_flag[i] is not present in the slice header, to determine the inferred value of delta_poc_lt_curr_pic_flag[i] in the slice header. If poc_lt_idc is equal to 0 or 1, delta_poc_lt_curr_pic_flag[i] is not present in the slice header and the value is inferred to be equal to poc_lt_idc, in this example. When poc_lt_idc is equal to 2, delta_poc_lt_curr_pic_flag[i] is signaled in the slice header, in this example. The value 3 for poc_lt_idc is reserved for future use, in this example.

Table 6 provides an example set of syntax for a slice header in accordance with the first example implementation.

TABLE 6

| slice_header( ) { | Descriptor |
|---|---|
| ... | |
| if( long_term_ref_pics_present_flag ) { | |
| num_long_term_pics | ue(v) |
| for( i = 0; i < num_long_term_pics; i++ ) { | |
| if( poc_lt_idc == 2 ) | |
| delta_poc_lt_curr_pic_flag[i] | u(1) |
| delta_poc_lt_len[i] | ue(v) |
| if(delta_poc_lt_len[i]!=0) | |
| delta_poc_lt[i] | u(v) |
| used_by_curr_pic_lt_flag[ i ] | u(1) |
| } | |
| } | |
| ... | |
| } | |

In this example, the slice header includes additional syntax elements of delta_poc_lt_curr_pic_flag[i], delta_poc_lt_len[i], and in some cases, delta_poc_lt[i]. An example set of semantics are described for these syntax elements below. Semantics for other syntax elements may remain the same as in WD7.

In this first example implementation, delta_poc_lt_curr_pic_flag[i] equal to 1 may specify that delta_poc_lt[i] represents the picture order count difference between the current picture and the i-th long-term reference picture. delta_poc_lt_curr_pic_flag[i] equal to 0 may specify that delta_poc_lt[i] represents the picture order count difference between the previous RAP picture in decoding order and the i-th long-term reference picture. If poc_lt_idc (e.g., of Table 5) is equal to 0 or 1, the value of delta_poc_lt_curr_pic_flag[i] may be inferred to be equal to poc_lt_idc.

In this first example implementation, delta_poc_lt_len[i] may be used to specify the number of bits to represent delta_poc_lt[i]. If delta_poc_lt_curr_pic_flag[i] is equal to 0, the value of delta_poc_lt_len[i] may be in the range of 0 to 24, inclusive. Otherwise, (delta_poc_lt_curr_pic_flag[i] is equal to 1), the value of delta_poc_lt_len[i] may be in the range of 1 to 24, inclusive.

The variable DeltaPocLtLen[i] may be derived as follows:

| |
|---|
| if( i == 0 ) |
|    DeltaPocLtLen[ i ] = delta_poc_lt_len[ i ] |
| else |
|    DeltaPocLtLen[ i ] = DeltaPocLtLen[ i − 1 ] + delta_poc_lt_len[ i ] |

Alternatively, delta_poc_lt_len[i] may be changed to poc_lt_len[i], which is fixed-length coded, e.g., as u(N), with N being 5. In this case, the semantics may be as follows. poc_lt_len[i] may specify the number of bits to represent delta_poc_lt[i]. If delta_poc_lt_curr_pic_flag[i] is equal to 0, the value of poc_lt_len[i] may be in the range of 0 to 24, inclusive, Otherwise, (delta_poc_lt_curr_pic_flag[i] is equal to 1), the value of poc_lt_len[i] may be in the range of 1 to 24, inclusive. The variable DeltaPocLtLen[i] may be set to be equal to poc_lt_len[i].

In this first example implementation, delta_poc_lt[i] may specify the delta picture order count value of the i-th long-term reference picture that is included in the long-term reference picture set of the current picture. The length of delta_poc_lt[i] may be DeltaPocLtLen[i].

Video decoder 30 may be configured to perform a decoding process for a reference picture set in accordance with this first example implementation as follows. Video encoder 20 may perform a similar process while encoding video data to generate the reference picture set. Video decoder 30 may invoke this decoding process once per picture, after decoding of a slice header but prior to the decoding of any coding unit and prior to the decoding process for reference picture list construction of the slice as specified in subclause 8.3.3 of WD7. The process may result in marking one or more reference pictures as "unused for reference." Quotations from WD7 starting with "NOTE" should be recognized merely as quotations taken directly from WD7, and not as necessary to the techniques of this disclosure.

NOTE 1—The reference picture set is an absolute description of the reference pictures used in the decoding process of the current and future coded pictures. The reference picture set signaling is explicit in the sense that all reference pictures included in the reference picture set are listed explicitly and there is no default reference picture set construction process in the decoder that depends on the status of the decoded picture buffer.

Reference pictures may be identified by their PicOrderCntVal values.

Five lists of picture order count values may be constructed to derive the reference picture set—PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is a CRA picture that is the first coded picture in the bitstream, an IDR picture, or a BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll may all be set to 0.

Otherwise, the following may apply for derivation of the five lists of picture order count values and the numbers of entries.

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal +
        DeltaPocS0[ StRpsIdx ][ i ]
    else
        PocStFoll[ k++ ] = PicOrderCntVal + DeltaPocS0[
        StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal +
        DeltaPocS1[ StRpsIdx ][ i ]
    else
        PocStFoll[ k++ ] = PicOrderCntVal +
        DeltaPocS1[ StRpsIdx ][ i ]
NumPocStCurrAfter = j
NumPocStFoll = k                                           (8-5)
for( i = 0, j = 0, k = 0; i < num_long_term_pics; i++ )
    if(used_by_curr_pic_lt_flag[i]){
        if(delta_poc_lt_curr_pic_flag[i])
            PocLtCurr[j]=PicOrderCntVal–delta_poc_lt[i]
        else
            PocLtCurr[j]=PrevRapPicPoc+delta_poc_lt[i]
        j++
    }
    else{
        if(delta_poc_lt_curr_pic_flag[i])
            PocLtFoll[k]=PicOrderCntVal–delta_poc_lt[i]
        else
            PocLtFoll[k]=PrevRapPicPoc+delta_poc_lt[i]
        k++
    }
NumPocLtCurr = j
NumPocLtFoll = k
``` where PicOrderCntVal and PrevRapPicPoc are the picture order count values of the current picture and the previous RAP picture in decoding order, respectively, as specified in subclause 8.2.1.

NOTE 2—A value of StRpsIdx in the range from 0 to num_short_term_ref_pic_sets−1, inclusive, may indicate that a short-term reference picture set from the active sequence parameter set is being used, where StRpsIdx is the index of the short-term reference picture set to the list of short-term reference picture sets in the order in which they are signaled in the sequence parameter set. StRpsIdx equal to num_short_term_ref_pic_sets indicates that a short-term reference picture set explicitly signaled in the slice header is being used.

The reference picture set may include five lists of reference pictures—RefPicSetStCurrBefore, RefPicSetStCurrAfter, RefPicSetStFoll, RefPicSetLtCurr and RefPicSetLtFoll. The variable NumPocTotalCurr may be set equal to NumPocStCurrBefore+NumPocStCurrAfter+NumPocLtCurr. When decoding a P or B slice, WD7 requires, for bitstream conformance, that the value of NumPocTotalCurr shall not be equal to 0.

NOTE 3—RefPicSetStCurrBefore, RefPicSetStCurrAfter and RefPicSetLtCurr may contain all reference pictures that may be used in inter prediction of the current picture and that may be used in inter prediction of one or more of the pictures following the current picture in decoding order. RefPicSetStFoll and RefPicSetLtFoll may include all reference pictures that are not used in inter prediction of the current picture but may be used in inter prediction of one or more of the pictures following the current picture in decoding order.

The marking of a reference picture can be "unused for reference," "used for short-term reference," or "used for long-term reference," but only one among these three, in WD7. When a reference picture is referred to as being marked as "used for reference," this collectively refers to the picture being marked as "used for short-term reference" or "used for long-term reference" (but not both in WD7). A reference picture that is marked as "used for short-term reference" is referred to as a short-term reference picture. A reference picture that is marked as "used for long-term reference" is referred to as a long-term reference picture.

The derivation process for the reference picture set and picture marking are performed according to the following ordered steps, where DPB refers to the decoded picture buffer as described in Annex C of WD7, where (#-#) refers to an equation number of WD7:

1. The following applies:

```
for( i = 0; i < NumPocLtCurr; i++ ) {
    if( there is a picture picX in the DPB with
    PicOrderCntVal equal to PocLtCurr[ i ] )
        RefPicSetLtCurr[ i ] = picX
    else
        RefPicSetLtCurr[ i ] = "no reference picture"
}
for( i = 0; i < NumPocLtFoll; i++ ) {                      (8-6)
    if( there is a picture picX in the DPB with
    PicOrderCntVal equal to PocLtFoll[ i ] )
        RefPicSetLtFoll[ i ] = picX
    else
        RefPicSetLtFoll[ i ] = "no reference picture"
}
```

2. All reference pictures included in RefPicSetLtCurr and RefPicSetLtFoll are marked as "used for long-term reference"

3. The following applies:

```
for( i = 0; i < NumPocStCurrBefore; i++ )
    if( there is a picture picX in the DPB with
    PicOrderCntVal equal to PocStCurrBefore[ i ])
        RefPicSetStCurrBefore[ i ] = picX
    else
        RefPicSetStCurrBefore[ i ] = "no reference picture"
for( i = 0; i < NumPocStCurrAfter; i++ )
    if( there is a picture picX in the DPB with
    PicOrderCntVal equal to PocStCurrAfter[ i ])
        RefPicSetStCurrAfter[ i ] = picX
    else
        RefPicSetStCurrAfter[ i ] = "no reference picture"  (8-7)
for( i = 0; i < NumPocStFoll; i++ )
    if( there is a picX in the DPB with
    PicOrderCntVal equal to PocStFoll[ i ])
        RefPicSetStFoll[ i ] = picX
    else
        RefPicSetStFoll[ i ] = "no reference picture"
```

4. All reference pictures included in RefPicSetStCurrBefore, RefPicSetStCurrAfter and RefPicSetStFoll are marked as "used for short-term reference."

All reference pictures in the decoded picture buffer that are not included in RefPicSetLtCurr, RefPicSetLtFoll, RefPicSetStCurrBefore, RefPicSetStCurrAfter or RefPicSetStFoll may be marked as "unused for reference."

NOTE 4—There may be one or more reference pictures that are included in the reference picture set but not present in the decoded picture buffer. Entries in RefPicSetStFoll or RefPicSetLtFoll that are equal to "no reference picture" should be ignored. Unless either of the following two conditions is true, an unintentional picture loss should be inferred, in WD7, for each entry in RefPicSetStCurrBefore, RefPicSetStCurrAfter and RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

Alternatively, WD7 may require that, in above, each identified picX in the DPB shall be marked as "used for reference." Alternatively, WD7 may restrict that a picture marked as "unused for reference" shall never be marked as "used for reference."

Alternatively, the above five steps may be replaced by the following:

1. The following applies:

```
for( i = 0; i < NumPocLtCurr; i++ ) {
    if( there is a picture picX in the DPB that has
    PicOrderCntVal equal to PocLtCurr[ i ] andthat
        is marked as "used for reference" )
        RefPicSetLtCurr[ i ] = picX
    else
        RefPicSetLtCurr[ i ] = "no reference picture"
}
for( i = 0; i < NumPocLtFoll; i++ ) {
    if( there is a picture picX in the DPB that has
    PicOrderCntVal equal to PocLtFoll[ i ] andthat
        is marked as "used for reference" )
        RefPicSetLtFoll[ i ] = picX
    else
        RefPicSetLtFoll[ i ] = "no reference picture"
}
```
(8-6)

2. All reference pictures included in RefPicSetLtCurr and RefPicSetLtFoll are marked as "used for long-term reference"

3. The following applies:

```
for( i = 0; i < NumPocStCurrBefore; i++ )
    if( there is a picture picX in the DPB that has
    PicOrderCntVal equal to PocStCurrBefore[ i ] and that
        is marked as "used for reference" )
        RefPicSetStCurrBefore[ i ] = picX
    else
        RefPicSetStCurrBefore[ i ] = "no reference picture"
for( i = 0; i < NumPocStCurrAfter; i++ )
    if( there is a picture picX in the DPB that has
    PicOrderCntVal equal to PocStCurrAfter[ i ] and that
        is marked as "used for reference" )
        RefPicSetStCurrAfter[ i ] = picX
    else
        RefPicSetStCurrAfter[ i ] = "no reference picture"
for( i = 0; i < NumPocStFoll; i++ )
    if( there is a picX in the DPB that has
    PicOrderCntVal equal to PocStFoll[ i ] and that
        is marked as "used for reference" )
        RefPicSetStFoll[ i ] = picX
    else
        RefPicSetStFoll[ i ] = "no reference picture"
```
(8-7)

4. All reference pictures included in RefPicSetStCurrBefore, RefPicSetStCurrAfter and RefPicSetStFoll are marked as "used for short-term reference."

5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference."

NOTE 4—There may be one or more reference pictures that are included in the reference picture set but not present in the decoded picture buffer. Entries in RefPicSetStFoll or RefPicSetLtFoll that are equal to "no reference picture" should be ignored, in accordance with WD7. Unless either of the following two conditions is true, an unintentional picture loss should be inferred for each entry in RefPicSetStCurrBefore, RefPicSetStCurrAfter and RefPicSetLtCurr that is equal to "no reference picture" in WD7: a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

Alternatively, the order of the above steps may be changed to 3, 4, 1, 2, and 5.

In some examples, WD7 requires, for bitstream conformance, that the reference picture set is restricted as follows:

There shall be no reference picture with temporal_id greater than that of the current picture included in RefPicSetStCurrBefore, RefPicSetStCurrAfter and RefPicSetLtCurr.

When the current picture is a TLA picture, there shall be no reference picture included in the reference picture set with temporal_id greater than or equal to the temporal_id of the current picture.

There shall be no reference picture included in the reference picture set that precedes, in output order, any RAP picture that precedes the current picture both in decoding order and output order.

Unless either of the following conditions is true, there shall be no entry in RefPicSetStCurrBefore, RefPicSetStCurrAfter or RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

NOTE 5—A reference picture cannot be included in more than one of the five reference picture set lists.

In some examples, WD7 provides that the above restrictions may be as follows:

There shall be no reference picture with temporal_id greater than that of the current picture included in RefPicSetStCurrBefore, RefPicSetStCurrAfter or RefPicSetLtCurr.

When the current picture is a TLA picture, there shall be no reference picture included in the reference picture set with temporal_id greater than or equal to the temporal_id of the current picture.

Let prevRapPic be the previous RAP picture in decoding order. When the current picture is a RAP picture or precedes, in output order, prevRapPic, there shall be no reference picture included in the reference picture set that precedes, in output order, any RAP picture that precedes the current picture both in decoding order and output order.

Let prevRapPic be the previous RAP picture in decoding order. When the current picture is not RAP picture and follows prevRapPic in output order, there shall be no reference picture included in the reference picture set that precedes prevRapPic in decoding order, and there shall be no reference picture included in the reference picture set that are TFD pictures.

Unless either of the following conditions is true, there shall be no entry in RefPicSetStCurrBefore, RefPicSetStCurrAfter or RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

NOTE 5—A reference picture cannot be included in more than one of the five reference picture set lists, in accordance with WD7.

A second example implementation, which is based on the syntax structure in HEVC WD7, includes a method to always signal the MSB cycle of the LTRP and remove the syntax element delta_poc_msb_present_flag[i]. Again, it should be understood that various techniques of the first example implementation and the second example implementation may be combined in any combination. Video encoder 20 and video decoder 30 may be configured to perform any or all of the techniques of this second example implementation, alone or in any combination with one or more of the techniques of the first example implementation discussed above. Table 7 below provides an example set of syntax for a slice header in accordance with this second example implementation.

TABLE 7

| slice_header( ) { | Descriptor |
|---|---|
| ... | u(1) |
| short_term_ref_pic_set_idx | u(v) |
| if( long_term_ref_pics_present_flag ) { | |
| num_long_term_pics | ue(v) |
| for( i = 0; i < num_long_term_pics; i++ ) { | |
| poc_lsb_lt[ i ] | u(v) |
| delta_poc_msb_cycle_lt[i] | ue(v) |
| used_by_curr_pic_lt_flag[ i ] | u(1) |
| } | |
| } | |
| ... | |
| byte_alignment( ) | |
| } | |

In the example slice header syntax of Table 7, the syntax element delta_poc_msb_cycle_lt[i] is added, relative to WD7. The semantics for this syntax element may be as described below, while the semantics for other syntax elements may remain the same as in WD7, unless otherwise indicated. In this second example implementation, delta_poc_msb_cycle_lt[i] may be used to determine the value of the most significant bits of the picture order count value of the i-th long-term reference picture that is included in the long-term reference picture set of the current picture.

In this second example implementation, the variable DeltaPocMSBCycleLt[i] may be derived as follows, where (#-#) refers to an equation number of WD7 and underlined text represents a change relative to WD7:

if( i == 0 )
    DeltaPocMSBCycleLt[ i ] = delta_poc_msb_cycle_lt[ i ];
else                                                                    (7-37)
    DeltaPocMSBCycleLt[ i ] = delta_poc_msb_cycle_lt[ i ] +
        DeltaPocMSBCycleLt[ i − 1 ];

Video decoder 30 may perform the following decoding process for a reference picture set. Video encoder 20 may be configured to perform a substantially similar process while encoding video data to generate the reference picture set. This process is invoked once per picture, after decoding of a slice header but prior to the decoding of any coding unit and prior to the decoding process for reference picture list construction of the slice as specified in subclause 8.3.3 of WD7. The process may result in marking one or more reference pictures as "unused for reference."

NOTE 1—The reference picture set is an absolute description of the reference pictures used in the decoding process of the current and future coded pictures. The reference picture set signaling is explicit in the sense that all reference pictures included in the reference picture set are listed explicitly and there is no default reference picture set construction process in the decoder that depends on the status of the decoded picture buffer.

Reference pictures are identified by their PicOrderCntVal values in this second example implementation.

Five lists of picture order count values may be constructed to derive the reference picture set—PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is a CRA picture that is the first coded picture in the bitstream, an IDR picture, or a BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal +
            DeltaPocS0[ StRpsIdx ][ i ]
    else
        PocStFoll[ k++ ] = PicOrderCntVal + DeltaPocS0
[ StRpsIdx ][ i ]NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal +
            DeltaPocS1[ StRpsIdx ][ i ]
    else
        PocStFoll[ k++ ] = PicOrderCntVal + DeltaPocS1
            [ StRpsIdx ][ i ]
NumPocStCurrAfter = j
NumPocStFoll = k                                                        (8-5)
for( i = 0, j = 0, k = 0; i < num_long_term_pics; i++ )
    if(used_by_curr_pic_lt_flag[i])
        PocLtCurr[j++]=PicOrderCntVal−DeltaPocMSBCycleLt[i]
            *MaxPicOrderCntLsb−
                                    pic_order_cnt_lsb+poc_lsb_lt[i]
    else
        PocLtFoll[k++]=PicOrderCntVal−
            DeltaPocMSBCycleLt[i]
            *MaxPicOrderCntLsb−

-continued

```
                  pic_order_cnt_lsb+poc_lsb_lt[i]
NumPocLtCurr = j
NumPocLtFoll = k
``` where PicOrderCntVal is the picture order count of the current picture as specified in subclause 8.2.1 of WD7.

NOTE 2—A value of StRpsIdx in the range from 0 to num_short_term_ref_pic_sets-1, inclusive, in this example indicates that a short-term reference picture set from the active sequence parameter set is being used, where StRpsIdx is the index of the short-term reference picture set to the list of short-term reference picture sets in the order in which they are signaled in the sequence parameter set. StRpsIdx equal to num_short_term_ref_pic_sets indicates that a short-term reference picture set explicitly signaled in the slice header is being used.

The reference picture set may include five lists of reference pictures—RefPicSetStCurrBefore, RefPicSetStCurrAfter, RefPicSetStFoll, RefPicSetLtCurr and RefPicSetLtFoll. The variable NumPocTotalCurr may be set equal to NumPocStCurrBefore+NumPocStCurrAfter+NumPocLtCurr. When decoding a P or B slice, WD7 requires, for bitstream conformance, that the value of NumPocTotalCurr shall not be equal to 0.

NOTE 3—RefPicSetStCurrBefore, RefPicSetStCurrAfter and RefPicSetLtCurr may contain all reference pictures that may be used in inter prediction of the current picture and that may be used in inter prediction of one or more of the pictures following the current picture in decoding order. RefPicSetStFoll and RefPicSetLtFoll may include all reference pictures that are not used in inter prediction of the current picture but may be used in inter prediction of one or more of the pictures following the current picture in decoding order.

The marking of a reference picture can be "unused for reference," "used for short-term reference," or "used for long-term reference," but only one among these three in WD7. When a reference picture is referred to as being marked as "used for reference," this collectively refers to the picture being marked as "used for short-term reference" or "used for long-term reference" (but not both, in WD7). A reference picture that is marked as "used for short-term reference" is referred to as a short-term reference picture. A reference picture that is marked as "used for long-term reference" is referred to as a long-term reference picture.

The derivation process for the reference picture set and picture marking may be performed, for the second example implementation, in the same way as in the first example implementation.

A third example implementation provides a simplified LTRP signaling method, along with a restriction that pictures following a CRA or BLA picture in decoding order are disallowed to use pictures preceding the CRA or BLA pictures in decoding order as LTRPs. Consequently, leading pictures are disallowed to refer to pictures that precede the associated CRA or BLA picture, in decoding order, as LTRPs. For non-TFD pictures, the number of bits required to signal the LTRP LSB may be determined by the picture with the smallest POC which is not marked as TFD, and that precedes, in decoding order, the current picture, and succeeds, in decoding order, the previous RAP picture in decoding order inclusive of the previous RAP picture in decoding order.

For TFD pictures, the number of bits required to signal the LTRP LSB is determined by the picture with the smallest POC that precedes, in decoding order, the current picture, and succeeds, in decoding order, the previous RAP picture in decoding order inclusive of the previous RAP picture in decoding order. The syntax structure is based on Wang et al., "On Reference Picture Set," JCTVC-I0342, contribution to JCTVC, 9$^{th}$ Meeting: Geneva, Switzerland, Apr. 27 to May 7, 2012, which as of 5 Feb. 2013 is available from http://phenix.int-evey.fr/jct/doc_end_user/documents/9_Geneva/wg11/JCTVC-I0342-v1.zip, which is hereby incorporated by reference, where the length of the LTRP LSB is signaled, followed by the LSB bits themselves. The changes in the semantics and decoding process of the reference picture set, with respect to HEVC WD7, are underlined in the description of this third example implementation below. Moreover, it should be understood that techniques of the third example implementation may be combined with techniques of the first and/or second example implementations, in any combination.

Table 8 provides an example set of syntax for a slice header in accordance with this third example implementation.

TABLE 8

| slice_header( ) { | Descriptor |
|---|---|
| ... | |
| if( long_term_ref_pics_present_flag ) { | |
|   num_long_term_pics | ue(v) |
|   for( i = 0; i < num_long_term_pics; i++ ) { | |
|     poc_lsb_len_delta[i] | ue(v) |
|     poc_lsb_lt[i] | u(v) |
|     used_by_curr_pic_lt_flag[ i ] | u(1) |
|   } | |
| } | |
| ... | |
| } | |

In the example of Table 8, the slice header includes additional syntax elements poc_lsb_len_delta[i] and poc_lsb_lt[i]. The semantics for these syntax elements are described below, and semantics for certain syntax elements that are changed relative to WD7 are also described below. The semantics for other syntax elements may remain the same as in WD7, unless otherwise indicated.

In the example of Table 8, poc_lsb_len_delta[i] may be used to specify the number of bits to represent poc_lsb_lt[i].

Let CurrPicOrderCntVal be the PicOrderCntVal of a current picture. The variables PrevLtRefPicPoc and PrevLtRefPicPocForTFD are derived as follows.

```
if(RapPicFlag||((CurrPicOrderCntVal<PrevLtRefPicPoc)&&
   (nal_unit_type!=2)))
      PrevLtRefPicPoc=CurrPicOrderCntVal
if(RapPicFlag||(CurrPicOrderCntVal<PrevLtRefPicPoc))
      PrevLtRefPicPocForTFD=CurrPicOrderCntVal
```

The variable MaxPocLsbLtLen may be derived as follows.

```
if(nal_unit_type==2)
      MaxPocLsbLtLen=Log2(Ceil(CurrPicOrderCntVal−
         PrevLtRefPicPocForTFD))
else
      MaxPocLsbLtLen=Log2(Ceil(CurrPicOrderCntVal−
         PrevLtRefPicPoc))
```

The variable PocLsbLtLen[i] may be set to equal to MaxPocLsbLtLen.

Alternatively, the variable PocLsbLtLen[i] may be derived as follows.

```
if( i = = 0 )
    PocLsbLtLen[ i ] =
        log2_max_pic_order_cnt_lsb_minus4 + 4 +
        poc_lsb_len_delta[ i ]
else
    PocLsbLtLen[ i ] = PocLsbLtLen[ i − 1 ]+
        poc_lsb_len_delta[ i ]
```

The value of PocLsbLtLen[i] may be in the range of log2_max_pic_order_cnt_lsb_minus4+4 to MaxPocLsbLtLen.

Alternatively, the syntax element need not be signaled, and the variable PocLsbLtLen[i] may be set to equal to MaxPocLsbLtLen.

In the example of Table 8, poc_lsb_lt[i] may specify the least significant bits of the picture order count value of the i-th long-term reference picture that is included in the long-term reference picture set of the current picture. poc_lsb_lt[i] shall be in the range of 0 to (1<<PocLsbLtLen[i])−1, inclusive. The length of poc_lsb_lt[i] is PocLsbLtLen[i].

Video decoder 30 may perform the following decoding process for a reference picture set in accordance with this third example implementation. Video encoder 20 may be configured to perform a substantially similar process while encoding video data to generate the reference picture set. This process may be invoked once per picture, after decoding of a slice header but prior to the decoding of any coding unit and prior to the decoding process for reference picture list construction of the slice as specified in subclause 8.3.3 of WD7. The process may result in marking one or more reference pictures as "unused for reference."

NOTE 1—The reference picture set may be an absolute description of the reference pictures used in the decoding process of the current and future coded pictures. The reference picture set signaling may be explicit in the sense that all reference pictures included in the reference picture set are listed explicitly and there is no default reference picture set construction process in the decoder that depends on the status of the decoded picture buffer.

Short-term reference pictures may be identified by their PicOrderCntVal values. Long-term reference pictures may be identified by the least significant bits of their PicOrderCntVal values.

Five lists of picture order count values or least significant bits of picture order count values may be constructed to derive the reference picture set—PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is a CRA picture that is the first coded picture in the bitstream, an IDR picture, or a BLA picture, PocStCurrBefore, PocStCurrAfter, PocStFoll, PocLtCurr, and PocLtFoll may all be set to empty, and NumPocStCurrBefore, NumPocStCurrAfter, NumPocStFoll, NumPocLtCurr, and NumPocLtFoll may all be set to 0.

Otherwise, the following may apply for derivation of the five lists of picture order count values and the numbers of entries.

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal +
            DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal +
            DeltaPocS1[ StRpsIdx ][ i ]
    else
        PocStFoll[ k++ ] = PicOrderCntVal +
            DeltaPocS1[ StRpsIdx ][ i ]
NumPocStCurrAfter = j
NumPocStFoll = k                                                    (8-5)
for( i = 0, j = 0, k = 0; i < num_long_term_pics; i++ )
    if(used_by_curr_pic_lt_flag[i]){
        PocLtCurr[j]=poc_lsb_lt[i]
        PocLsbLenCurr[j]=PocLsbLtLen[i]
        j++
    }
    else{
        PocLtFoll[k]=poc_lsb_lt[i]
        PocLsbLenFoll[k]=PocLsbLtLen[i]
        k++
    }
NumPocLtCurr = j
NumPocLtFoll = k
``` where PicOrderCntVal is the picture order count of the current picture as specified in subclause 8.2.1 of WD7.

NOTE 2—A value of StRpsIdx in the range from 0 to num_short_term_ref_pic_sets-1, inclusive, may indicate that a short-term reference picture set from the active sequence parameter set is being used, where StRpsIdx is the index of the short-term reference picture set to the list of short-term reference picture sets in the order in which they are signaled in the sequence parameter set. StRpsIdx equal to num_short_term_ref_pic_sets may indicate that a short-term reference picture set that is explicitly signaled in the slice header is being used.

The reference picture set may include five lists of reference pictures—RefPicSetStCurrBefore, RefPicSetStCurrAfter, RefPicSetStFoll, RefPicSetLtCurr and RefPicSetLtFoll. The variable NumPocTotalCurr is set equal to NumPocStCurrBefore+NumPocStCurrAfter+NumPocLtCurr. When decoding a P or B slice, WD7 requires, for bitstream conformance, that the value of NumPocTotalCurr shall not be equal to 0.

NOTE 3—RefPicSetStCurrBefore, RefPicSetStCurrAfter and RefPicSetLtCurr may contain all reference pictures that may be used in inter prediction of the current picture and that may be used in inter prediction of one or more of the pictures following the current picture in decoding order. RefPicSetStFoll and RefPicSetLtFoll may include all reference pictures that are not used in inter prediction of the current picture but may be used in inter prediction of one or more of the pictures following the current picture in decoding order.

The marking of a reference picture can be "unused for reference," "used for short-term reference," or "used for long-term reference," but only one among these three in WD7. When a reference picture is referred to as being marked as "used for reference," this collectively refers to the picture being marked as "used for short-term reference" or "used for long-term reference" (but not both in WD7). A reference picture that is marked as "used for short-term reference" is referred to as a short-term reference picture. A reference picture that is marked as "used for long-term reference" is referred to as a long-term reference picture.

The derivation process for the reference picture set and picture marking are performed according to the following ordered steps, where DPB refers to the decoded picture buffer as described in Annex C of WD7:

1. The following applies:

```
for( i = 0; i < NumPocLtCurr; i++ ) {
    if( there is a long-term reference picture picX in the DPB
            withPicOrderCntValforwhich
GetLSB(PicOrderCntVal,PocLsbLenCurr[i])is
equaltoPocLtCurr[i])
        RefPicSetLtCurr[ i ] = picX
    else if( there is a short-term reference picture picY in the DPB
            withPicOrderCntValforwhich
GetLSB(PicOrderCntVal,PocLsbLenCurr[i])is
equaltoPocLtCurr[i])
        RefPicSetLtCurr[ i ] = picY
    else
        RefPicSetLtCurr[ i ] = "no reference picture"
}                                                                    (8-6)
for( i = 0; i < NumPocLtFoll; i++ ) {
    if( there is a long-term reference picture picX in the DPB
            withPicOrderCntValforwhich
GetLSB(PicOrderCntVal,PocLsbLenFoll[i])
isequaltoPocLtFoll[i])
        RefPicSetLtFoll[ i ] = picX
    else if( there is a short-term reference picture picY in the DPB
            withPicOrderCntValforwhich
GetLSB(PicOrderCntVal,PocLsbLenFoll[i])
isequaltoPocLtFoll[i])
        RefPicSetLtFoll[ i ] = picY
    else
        RefPicSetLtFoll[ i ] = "no reference picture"
}
```

2. All reference pictures included in RefPicSetLtCurr and RefPicSetLtFoll are marked as "used for long-term reference"

3. The following applies:

```
for( i = 0; i < NumPocStCurrBefore; i++ )
    if( there is a short-term reference picture picX in the DPB
            with PicOrderCntVal equal to PocStCurrBefore[ i ])
        RefPicSetStCurrBefore[ i ] = picX
    else
        RefPicSetStCurrBefore[ i ] = "no reference picture"
for( i = 0; i < NumPocStCurrAfter; i++ )
    if( there is a short-term reference picture picX in the DPB
            with PicOrderCntVal equal to PocStCurrAfter[ i ])
        RefPicSetStCurrAfter[ i ] = picX
    else
        RefPicSetStCurrAfter[ i ] = "no reference picture"    (8-7)
for( i = 0; i < NumPocStFoll; i++ )
    if( there is a short-term reference picture picX in the DPB
            with PicOrderCntVal equal to PocStFoll[ i ])
        RefPicSetStFoll[ i ] = picX
    else
        RefPicSetStFoll[ i ] = "no reference picture"
```

4. All reference pictures included in RefPicSetStCurrBefore, RefPicSetStCurrAfter and RefPicSetStFoll are marked as "used for short-term reference."

5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference."

NOTE 4—There may be one or more reference pictures that are included in the reference picture set but not present in the decoded picture buffer. Entries in RefPicSetStFoll or RefPicSetLtFoll that are equal to "no reference picture" should be ignored in accordance with WD7. Unless either of the following two conditions is true, an unintentional picture loss may be inferred for each entry in RefPicSetStCurrBefore, RefPicSetStCurrAfter and RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

WD7 requires, for bitstream conformance, that the reference picture set is restricted as follows, as revised by this third example implementation:

There shall be no reference picture with temporal_id greater than that of the current picture included in RefPicSetStCurrBefore, RefPicSetStCurrAfter and RefPicSetLtCurr.

When the current picture is a TLA picture, there shall be no reference picture included in the reference picture set with temporal_id greater than or equal to the temporal_id of the current picture.

There shall be no reference picture included in the reference picture set that precedes, in output order, any RAP picture that precedes the current picture both in decoding order and output order.

Unless either of the following conditions is true, there shall be no entry in RefPicSetStCurrBefore, RefPicSetStCurrAfter or RefPicSetLtCurr that is equal to "no reference picture": a) the first coded picture in the bitstream is a CRA picture and the current coded picture is a TFD picture associated with the first coded picture in the bitstream; b) the previous RAP picture preceding the current coded picture in decoding order is a BLA picture and the current coded picture is a TFD picture associated with the BLA picture.

NOTE 5—A reference picture cannot be included in more than one of the five reference picture set lists.

For each value of i in the range of 0 to NumPocLtCurr−1, inclusive, there shall be no more than one reference picture in the DPB that is not included in RefPicSetStCurrBefore, RefPicSetStCurrAfter or RefPicSetStFoll, and that has PicOrderCntVal for which GetLSB(PicOrderCntVal, PocLsbLenCurr[i]) is equal to PocLtCurr[i]. For each value of i in the range of 0 to NumPocLtFoll−1, inclusive, there shall not be more than one reference picture in the DPB that is not included in RefPicSetStCurrBefore, RefPicSetStCurrAfter or RefPicSetStFoll, and that has PicOrderCntVal for which GetLSB(PicOrderCntVal, PocLsbLenFoll[i]) is equal to PocLtFoll[i].

Let prevRapPic be the previous RAP picture in decoding order. When the current picture is a RAP picture or precedes, in output order, prevRapPic, there shall be no reference picture included in the either RefPicSetLtCurr or RefPicSetLtFoll that precedes, in decoding order, prevRapPic.

A fourth example implementation provides an LTRP signaling method based on the syntax structure in the third example implementation discussed above, where the length of LTRP LSB is signaled, followed by the LSB bits themselves. The restriction on leading pictures not referring to pictures before the associated RAP is removed in this fourth example implementation. The TFD pictures associated with a RAP picture are disallowed to succeed, in decoding order, any DLP picture associated with the same RAP picture in this fourth example implementation. For non-TFD pictures, the number of bits required to signal the LTRP LSB may be determined by the picture with the smallest POC which is not marked as a TFD picture, and that precedes the current picture, in decoding order, and succeeds, in decoding order, the previous RAP picture in decoding order, inclusive of the previous RAP picture in decoding order. For TFD pictures, the number of bits required to signal the LTRP LSB may be determined by the picture with the smallest POC that precedes, in decoding order, the current picture, and succeeds, in output order, the RAP before the previous RAP picture in decoding order inclusive of the RAP before previous RAP picture in decoding order. Only changes to the semantics and RPS derivation process from the third example implementation are presented below. It should be understood that the techniques of the fourth example implementation may be combined with any of the techniques of the first, second, and/or third example implementations, in any combination. Underlined text represents changes relative to the third example implementation described above.

In this fourth example implementation, poc_lsb_len_delta [i] may be used to specify the number of bits to represent poc_lsb_lt[i].

Let CurrPicOrderCntVal be the PicOrderCntVal of a current picture. Let PrevRapPicPoc be the PicOrderCntVal of the RAP picture that precedes, in decoding order, the current picture. The variables PrevPrevLtRefPicPoc and PrevLtRefPicPoc are derived as follows.

```
if(RapPicFlag)
    PrevPrevLtRefPicPoc=PrevRapPicPoc
if(RapPicFlag||((CurrPicOrderCntVal<PrevLtRefPicPoc)&&
(nal_unit_type!=2)))
    PrevLtRefPicPoc=CurrPicOrderCntVal
```

The variable MaxPocLsbLtLen may be derived as follows.

```
if((nal_unit_type==4)||
(nal_unit_type==5)||(nal_unit_type==2))
    MaxPocLsbLtLen=Log2(Ceil(CurrPicOrderCntVal−
    PrevPrevLtRefPicPoc))
else
    MaxPocLsbLtLen=Log2(Ceil(CurrPicOrderCntVal−
    PrevLtRefPicPoc))
```

The derivation process for PocLsbLtLen[i] may be performed in the same way as in the third example implementation, as described above.

Video decoder 30 may perform the following decoding process for a reference picture set. Video encoder 20 may be configured to perform a substantially similar process while encoding video data to generate the reference picture set. This process may be invoked once per picture, after decoding of a slice header but prior to the decoding of any coding unit and prior to the decoding process for reference picture list construction of the slice as specified in subclause 8.3.3 of WD7. The process may result in marking one or more reference pictures as "unused for reference."

NOTE 1—The reference picture set may be an absolute description of the reference pictures used in the decoding process of the current and future coded pictures. The reference picture set signaling is explicit in the sense that all reference pictures included in the reference picture set are listed explicitly and there is no default reference picture set construction process in the decoder that depends on the status of the decoded picture buffer.

In this fourth example implementation, reference pictures are identified by their PicOrderCntVal values.

Five lists of picture order count values may be constructed to derive the reference picture set—PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

Ellipses below represent that text may remain the same as in the third example implementation and/or in the current version of WD7:

If the current picture is a CRA picture that is the first coded picture in the bitstream, an IDR picture, or a BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

. . .

For each value of i in the range of 0 to NumPocLtCurr−1, inclusive, there shall be no more than one reference picture in the DPB that is not included in RefPicSetStCurrBefore, RefPicSetStCurrAfter or RefPicSetStFoll, and that has PicOrderCntVal for which GetLSB (PicOrderCntVal, PocLsbLenCurr[i]) is equal to PocLtCurr[i]. For each value of i in the range of 0 to NumPocLtFoll−1, inclusive, there shall not be more than one reference picture in the DPB that is not included in RefPicSetStCurrBefore, RefPicSetStCurrAfter or RefPicSetStFoll, and that has PicOrderCntVal for which GetLSB(PicOrderCntVal, PocLsbLenFoll[i]) is equal to PocLtFoll[i].

Any TFD picture associated with the CRA or BLA picture shall precede any picture that is not marked TFD, precedes, in output order, the CRA or BLA picture and succeeds, in decoding order, the CRA or BLA picture.

A fifth example implementation is also generally based on the third example implementation. This fifth example implementation discloses a method that disallows the leading pictures associated with a CRA or BLA picture to refer to the associated CRA or BLA picture or other leading pictures associated with the same CRA or BLA picture as LTRPs. The restriction, in the third example implementation, on leading pictures not referring to pictures before the associated RAP as LTRPs is removed in this fifth example implementation. The number of bits required to signal the LTRP LSB may be determined by the RAP picture that precedes, in output order, the current picture in this fifth example implementation. Moreover, it should be understood that the techniques of this fifth example implementation may be combined with any of the techniques of the first, second, third, and/or fourth example implementations, in any combination.

In this fifth example implementation, the slice header semantics of the third example implementation may be changed as indicated by the underlined text below:

Let CurrPicOrderCntVal be the PicOrderCntVal of a current picture. Let PrevRapPicPoc be the PicOrderCntVal of the RAP picture that precedes, in output order, the current picture.

The variable MaxPocLsbLtLen may be derived as follows.

MaxPocLsbLtLen=Log 2(Ceil(CurrPicOrderCntVal−
PrevRapPicPoc))

The derivation process for PocLsbLtLen[i] may be performed in the same way as in the third example implementation.

Video decoder 30 may perform the following decoding process for a reference picture set. Video encoder 20 may be configured to perform a substantially similar process while encoding video data to generate the reference picture set. This process may be invoked once per picture, after decoding of a slice header but prior to the decoding of any coding unit and prior to the decoding process for reference picture list construction of the slice as specified in subclause 8.3.3 of WD7. The process may result in marking one or more reference pictures as "unused for reference."

NOTE 1—The reference picture set may be an absolute description of the reference pictures used in the decoding process of the current and future coded pictures. The reference picture set signaling is explicit in the sense that all reference pictures included in the reference picture set are listed explicitly and there is no default reference picture set construction process in the decoder that depends on the status of the decoded picture buffer.

In this fifth example implementation, reference pictures are identified by their PicOrderCntVal values.

Five lists of picture order count values may be constructed to derive the reference picture set—PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

Ellipses below represent that text may remain the same as in the third example implementation and/or in the current version of WD7:

If the current picture is a CRA picture that is the first coded picture in the bitstream, an IDR picture, or a BLA picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

. . .

For each value of i in the range of 0 to NumPocLtCurr−1, inclusive, there shall be no more than one reference picture in the DPB that is not included in RefPicSetStCurrBefore, RefPicSetStCurrAfter or RefPicSetStFoll, and that has PicOrderCntVal for which GetLSB (PicOrderCntVal, PocLsbLenCurr[i]) is equal to PocLtCurr[i]. For each value of i in the range of 0 to NumPocLtFoll−1, inclusive, there shall not be more than one reference picture in the DPB that is not included in RefPicSetStCurrBefore, RefPicSetStCurrAfter or RefPicSetStFoll, and that has PicOrderCntVal for which GetLSB(PicOrderCntVal, PocLsbLenFoll[i]) is equal to PocLtFoll[i].

Let prevRapPic be the previous RAP picture in decoding order. When the current picture precedes, in output order, prevRapPic, there shall be no reference picture included in either RefPicSetLtCurr or RefPicSetLtFoll, which is either prevRapPic, or any picture that precedes, in output order prevRapPic, but succeeds prevRapPic, in decoding order.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
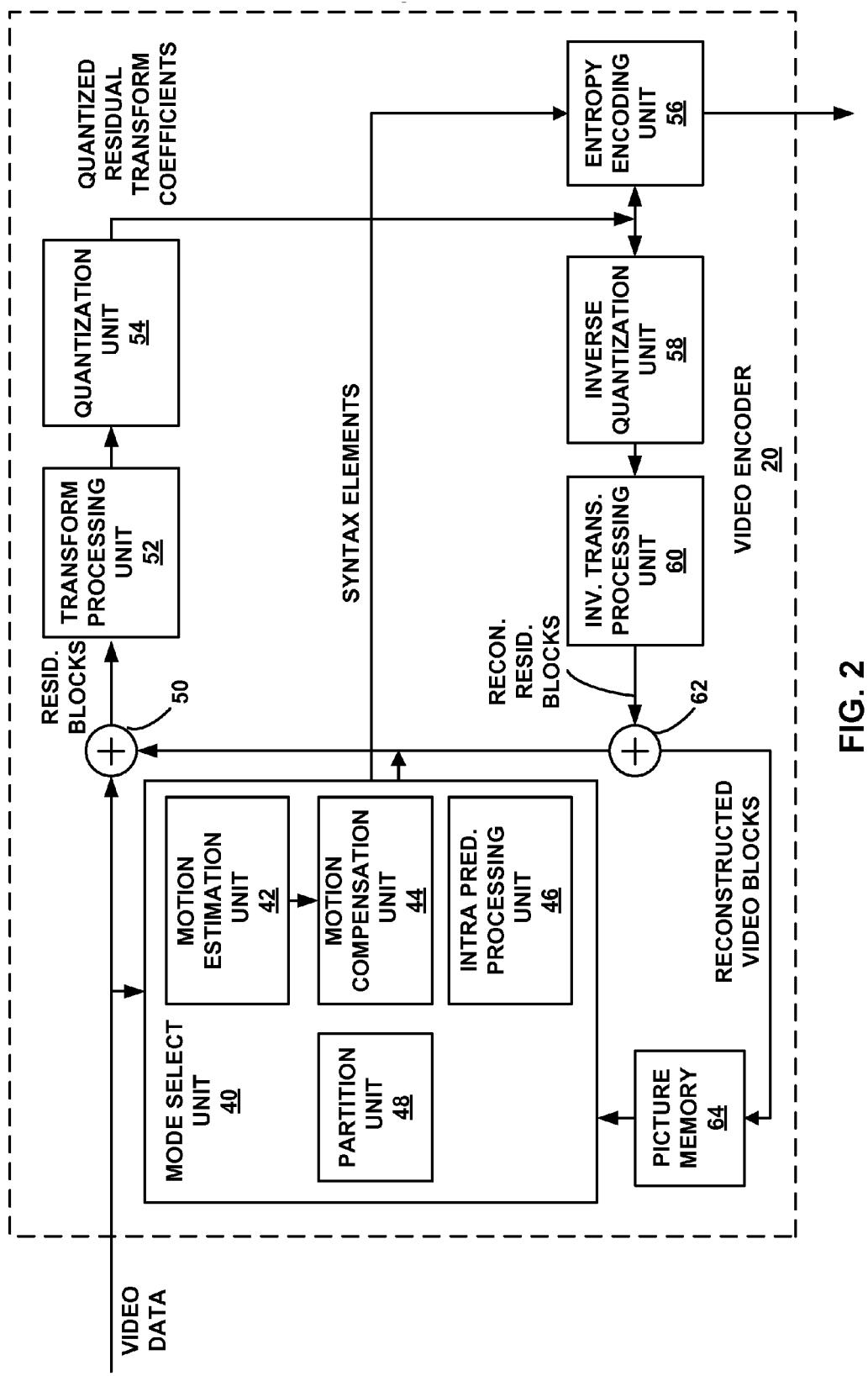
FIG. 2 is a block diagram illustrating an example of a video encoder that may implement techniques for signaling long-term reference pictures in slice headers.

FIG. 2 is a block diagram illustrating an example of video encoder 20 that may implement techniques for signaling long-term reference pictures in slice headers. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit

40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Mode select unit 40 can implement the restrictions of this disclosure, when selecting reference pictures from reference picture memory 64. For example, mode select unit 40 may determine whether a particular picture follows a picture that was selected as a RAP. If so, mode select unit 40 may determine whether the picture is a leading picture and follows a DLP picture that is associated with the same RAP in output order. If so, mode select unit 40 selects encoding modes for the picture such that the picture is treated as a DLP picture. That is, mode select unit 40 ensures that the current picture is not predicted from any pictures preceding the RAP or any associated TFD pictures, and thus, all TFD pictures precede all DLP pictures in output order. In other words, a picture that might otherwise have been coded as a TFD picture is coded as a DLP picture if the picture follows another DLP picture in coding order. Similarly, mode select unit 40 may select coding modes to ensure that all leading pictures precede in decoding order all trailing pictures for a RAP.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy enencoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 of FIG. 2 represents an example of a video encoder that may be configured to perform any of the techniques of this disclosure. For example, video encoder 20 can be configured to code a RAP picture and code one or more decodable leading pictures DLPs for the RAP picture such that all pictures that are targeted for discard precede the DLPs associated with the RAP picture in display order. The DLPs may include one or more pictures having display order values earlier than a display order value of the RAP picture and that do not refer to video data earlier than the RAP picture in decoding order. Video encoder 20 may also code one or more leading pictures relative to the RAP picture such that all of the leading pictures for the RAP picture precede all trailing pictures for the RAP picture in decoding order, where the trailing pictures include pictures having display order values that are greater than a display order value of the RAP picture. The RAP picture may include, for example, one of a CRA picture and a BLA picture. Any picture preceding a CRA or BLA picture in decoding order may precede any DLP picture associated with the CRA picture or the BLA picture in display order. Video encoder 20 may also code one or more leading pictures associated with the RAP picture, where the leading pictures precede the RAP picture in display order value and succeed the RAP picture in decoding order, and video encoder 20 may code one or more trailing pictures associated with the RAP picture such that all of the leading pictures precede all the trailing pictures in decoding order, where the trailing pictures succeed the RAP picture both in display order value and in decoding order.

Video encoder 20 may also code one or more tagged for discard (TFD) pictures associated with the RAP picture. The one or more TFD pictures may precede the RAP picture in display order value and succeed the RAP picture in decoding order and refer to video data earlier than the RAP picture in the decoding order. Video encoder 20 may code the one or more DLPs for the RAP picture by coding the one or more DLPs associated with the RAP picture such that all the TFD pictures precede the DLPs in display order, where the DLPs precede the RAP picture in display order and succeed the RAP picture in the decoding order and do not refer to video data earlier than the RAP picture in the decoding order.

Video encoder 20 may also code one or more pictures that precede the RAP picture in a decoding order. Video encoder 20 may code the one or more DLPs by coding the one or more DLPs associated with the RAP picture such that all pictures that precede the RAP picture in decoding order also precede all the DLPs in display order. The DLPs may precede the RAP picture in display order and succeed the RAP picture in decoding order and do not refer to video data earlier than the RAP picture in decoding order.

Figure 3:
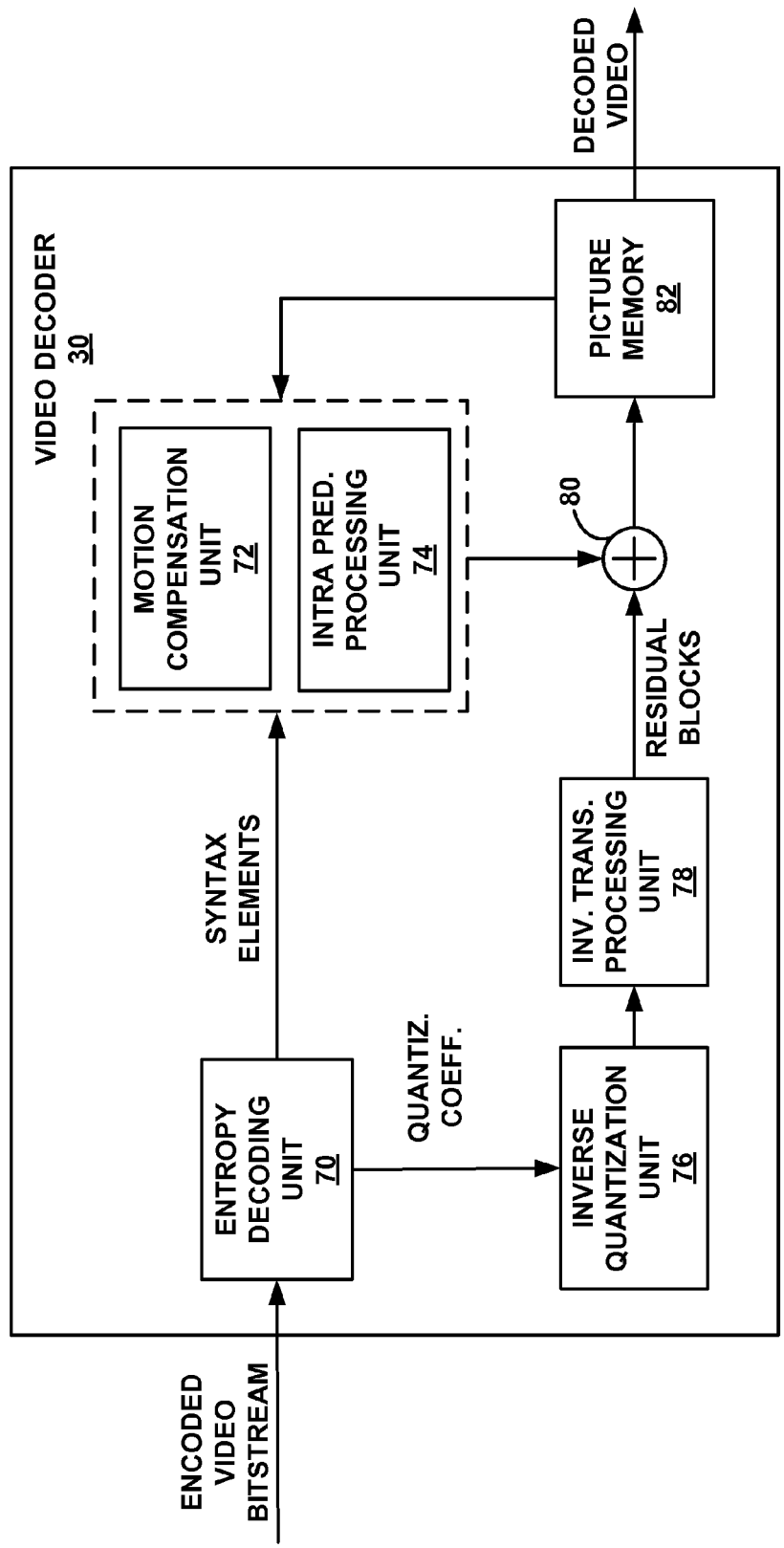
FIG. 3 is a block diagram illustrating an example of a video decoder that may implement techniques for signaling long-term reference pictures in slice headers.

FIG. 3 is a block diagram illustrating an example of video decoder 30 that may implement techniques for signaling long-term reference pictures in slice headers. In the example of FIG. 3, video decoder 30 includes an entropy decoding unit 70, motion compensation unit 72, intra-prediction processing unit 74, inverse quantization unit 76, inverse transformation processing unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction processing unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction processing unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

When implementing techniques of this disclosure, video decoder 30 may receive a RAP picture and determine that the RAP picture is used as a random access point for a bitstream. The determination that the RAP picture is to be used by video decoder 30 as a random access point may, for example, be based on signaling in the bitstream. For pictures following the RAP picture in coding order, the video decoder may determine if the pictures are TFD pictures. If a picture is a TFD picture, then video decoder 30 may parse syntax associated with the TFD picture without necessarily decoding the TFD picture. For example, based on a NAL unit type, the video decoder may identify TFD pictures and not fully decode the TFD picture. If video decoder 30 determines that a picture is a DLP, then video decoder 30 may decode the picture.

Video decoder 30 of FIG. 3 represents an example of a video encoder that may be configured to perform any of the techniques of this disclosure. For example, video encoder 20 can be configured to code a RAP picture and code one or more decodable leading pictures DLPs for the RAP picture such that all pictures that are targeted for discard precede the DLPs associated with the RAP picture in display order. The DLPs may include one or more pictures having display order values earlier than a display order value of the RAP picture and that do not refer to video data earlier than the RAP picture in decoding order. Video decoder 30 may also code one or more leading pictures relative to the RAP picture such that all of the leading pictures for the RAP picture precede all trailing pictures for the RAP picture in decoding order, where the trailing pictures include pictures having display order values that are greater than a display order value of the RAP picture. The RAP picture may include, for example, one of a CRA picture and a BLA picture. Any picture preceding a CRA or BLA picture in decoding order may precede any DLP picture associated with the CRA picture or the BLA picture in display order. Video encoder 20 may also code one or more leading pictures associated with the RAP picture, where the leading pictures precede the RAP picture in display order value and succeed the RAP picture in decoding order, and video decoder 30 may code one or more trailing pictures associated with the RAP picture such that all of the leading pictures precede all the trailing pictures in decoding order, where the trailing pictures succeed the RAP picture both in display order value and in decoding order.

Video decoder 30 may also code one or more tagged for discard (TFD) pictures associated with the RAP picture. The one or more TFD pictures may precede the RAP picture in display order value and succeed the RAP picture in decoding order and refer to video data earlier than the RAP picture in the decoding order. Video encoder 20 may code the one or more DLPs for the RAP picture by coding the one or more DLPs associated with the RAP picture such that all the TFD pictures precede the DLPs in display order, where the DLPs precede the RAP picture in display order and succeed the RAP picture in the decoding order and do not refer to video data earlier than the RAP picture in the decoding order.

Video decoder 30 may also code one or more pictures that precede the RAP picture in a decoding order. Video decoder 30 may code the one or more DLPs by coding the one or more DLPs associated with the RAP picture such that all pictures that precede the RAP picture in decoding order also precede all the DLPs in display order. The DLPs may precede the RAP picture in display order and succeed the RAP picture in decoding order and do not refer to video data earlier than the RAP picture in decoding order.

Figure 4:
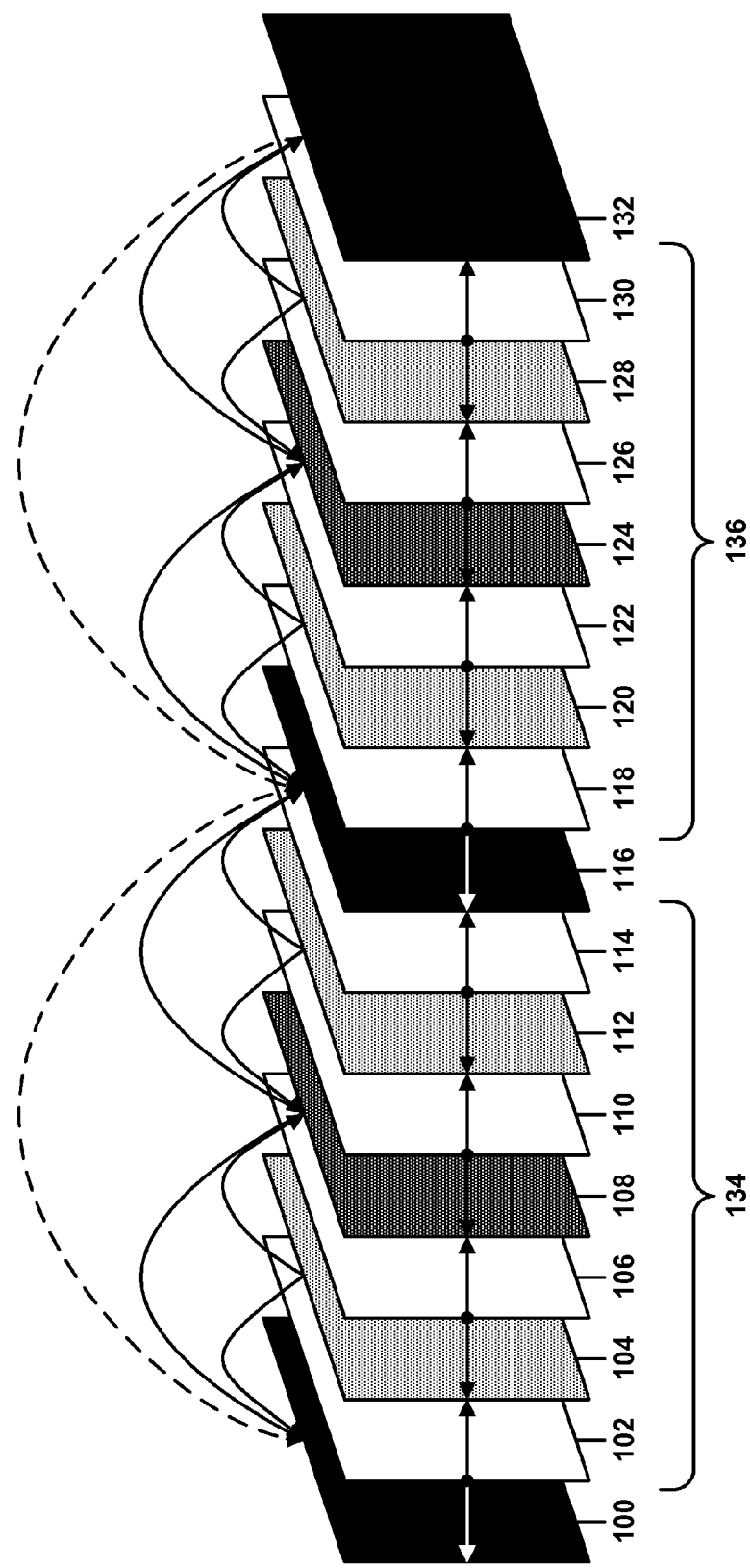
FIG. 4 is a conceptual diagram illustrating a sequence of coded video pictures.

FIG. 4 is a conceptual diagram illustrating a sequence of coded video pictures 100-132. FIG. 4 illustrates the relationships between RAPs, leading pictures, TFDs, and trailing pictures. The pictures are shaded differently to indicate positions within a hierarchical prediction structure. For example, pictures 100, 116, and 132 are shaded black to represent that pictures 100, 116, 132 are at the top of the hierarchical prediction structure. Pictures 100, 116, 132 may comprise, for example, intra-coded pictures or inter-coded pictures that are predicted from other pictures in a single direction (e.g., P-pictures). When intra-coded, pictures 100, 116, 132 are predicted solely from data within the same picture. When inter-coded, picture 116, for example, may be coded relative to data of picture 100, as indicated by the dashed arrow from picture 116 to picture 100. Pictures 116, 132 form key pictures of groups of pictures (GOPs) 134, 136, respectively.

Pictures 108, 124 are darkly shaded to indicate that they are next in the encoding hierarchy following pictures 100, 116, and 132. Pictures 108, 124 may comprise bi-directional, inter-mode prediction encoded pictures. For example, picture 108 may be predicted from data of pictures 100 and 116, while picture 124 may be predicted from pictures 116 and 132. Pictures 104, 112, 120, and 128 are lightly shaded to indicate that they are next in the encoding hierarchy following pictures 108 and 124. Pictures 104, 112, 120, and 128 may also comprise bi-directional, inter-mode prediction encoded pictures. For example, picture 104 may be predicted from pictures 100 and 108, picture 112 may be predicted from pictures 108 and 116, picture 120 may be predicted from picture 116 and 124, and picture 128 may be predicted from picture 124 and 132. In general, pictures that are lower in the hierarchy may be encoded from any reference pictures that are higher in the hierarchy, assuming that the reference pictures are still buffered in a decoded picture buffer, and assuming that the reference pictures were coded earlier than the picture currently being coded.

Finally, pictures 102, 106, 110, 114, 118, 122, 126, and 130 are shaded white to indicate that these pictures are last in the encoding hierarchy. Pictures 102, 106, 110, 114, 118, 122, 126, and 130 may be bi-directional, inter-mode prediction encoded pictures. Picture 102 may be predicted from pictures 100 and 104, picture 106 may be predicted from pictures 104 and 108, picture 110 may be predicted from pictures 108 and 112, picture 114 may be predicted from pictures 112 and 116, picture 118 may be predicted from picture 116 and 120, picture 122 may be predicted from pictures 120 and 124, picture 126 may be predicted from pictures 124 and 128, and picture 130 may be predicted from pictures 128 and 132. Again, it should be understood that pictures lower in the coding hierarchy may be coded from other pictures that are higher in the coding hierarchy. For example, any or all of pictures 102, 106, 110, or 114 may be predicted relative to any of pictures 100, 116, or 108, in addition or in the alternative.

Pictures 100-132 are illustrated in display order. That is, following decoding, picture 100 is displayed before picture 102, picture 102 is displayed before picture 104, and so on. As discussed above, POC values generally describe a display order for pictures, which is also substantially the same as the order in which raw pictures were captured or generated prior to being encoded. However, due to the encoding hierarchy, pictures 100-132 may be decoded in a different order. Moreover, while being encoded, pictures 100-132 may be arranged in decoding order in a bitstream including encoded data for pictures 100-132. For example, picture 116 may be displayed last among pictures of GOP 134. However, due to the encoding hierarchy, picture 116 may be decoded first of GOP 134. That is, in order to properly decode picture 108, for example, picture 116 may need to be decoded first, in order to act as a reference picture for picture 108. Likewise, picture 108 may act as a reference picture for pictures 104, 106, 110, and 112, and therefore may need to be decoded before pictures 104, 106, 110, and 112.

Furthermore, certain pictures may be treated as long-term reference pictures, while other pictures may be treated as short-term reference pictures. Suppose, for example, that pictures 100 and 116 represent long-term reference pictures, while pictures 108, 104, and 112 represent short-term reference pictures. It may be the case, in this example, that pictures 102 and 106 may be predicted relative to any of pictures 100, 116, 108, or 104, but that pictures 110 and 114 may be predicted relative to any of pictures 100, 116, 108, or 112. In other words, picture 104 may not be available for reference when coding pictures 110 and 114. As another example, assuming that pictures 100 and 116 represent long-term reference pictures and pictures 108, 104, and 112 represent short-term reference pictures, pictures 108, 104, and 112 may not be available for reference when coding pictures 118, 122, 126, and 130. In accordance with the techniques of this disclosure, data regarding long-term reference pictures may be signaled in slice headers of slices for any or all of pictures 100-132.

In the example of FIG. 4, arrows represent potential prediction relationships, where the tail end of each arrow represents a picture that may be predicted, and the head of each arrow represents a picture from which the picture may be predicted (that is, the arrow head points to a potential reference picture). Although picture 116 has an arrow pointing to picture 100, for purposes of example, assume that picture 116 is intra-prediction coded (that is, coded without reference to any other picture). Moreover, assume that picture 108 is coded as a P-picture with reference to picture 116. Furthermore, assume that picture 116 is being used as a random access point, e.g., as an IDR, BLA, or CRA picture. That is, a bitstream retrieved starting with picture 116 would include each of pictures 102-132 in decoding order, but would not include picture 100.

In this example, under the assumptions stated above, pictures 102, 104, and 106 represent TFD pictures, because pictures 102, 104, and 106 depend, directly or indirectly, from picture 100. Pictures 108-114 represent examples of DLPs, because pictures 108-114 do not depend directly or indirectly on picture 100, and have a display order earlier than picture 116, but a decoding order that is later than picture 116. Pictures 118-132 represent trailing pictures in this example, because the display order and decoding order of pictures 118-132 are both later than picture 116. According to the techniques of this disclosure, when coding one or more DLPs for a RAP picture, the DLPs can be coded such that all pictures that are targeted for discard precede the DLPs associated with the RAP picture in a display order. For example, as discussed above with respect to FIG. 2, when coding picture 108, mode select unit 40 may determine to code picture 108 as a P-picture relative to, e.g., picture 116. In this manner, picture 108 may be classified as a DLP. Accordingly, mode select unit 40 may determine to code each of pictures 110, 112, 114 as DLPs as well, rather than as TFDs. Similarly, video decoder 30 may, upon determining that picture 108 is a DLP, determine that the subsequent pictures in output order are decodable. On the other hand, video decoder 30 may simply parse, without decoding, data for any pictures that are TFD. In this example, video decoder 30 may determine that pictures 102, 104, and 106 are TFD pictures, and therefore, simply parse data for these pictures without attempting to decode the pictures. For pictures that have output order later than picture 108, video decoder 30 may begin decoding as normal, without determining whether the pictures are TFD or DLP, because, in accordance with the restrictions proposed in this disclosure, all TFD pictures precede all DLP pictures in output order.

As discussed above, this disclosure proposes several restrictions for supporting random access based on these various types of pictures. First, all TFD pictures for a RAP picture should have a display order value that is earlier than the display order value for all DLPs for the RAP. This restriction may improve a viewer's viewing experience, because it avoids choppiness in the frame rate. That is, if there are one or more pictures that cannot be correctly decoded (i.e., TFD pictures), if these pictures had display order values intermingled with the DLPs, the frame rate would appear choppy, which would diminish user experience. This disclosure also proposes a restriction in which interleaving of leading pictures with "trailing pictures" in decoding order is prevented. That is, in accordance with the techniques of this disclosure, video coders may ensure that all leading pictures (including both TFD pictures and DLPs)

have decoding order values earlier than decoding order values of pictures that have display order values greater than the display order value of the corresponding RAP picture. As noted above, "trailing pictures" are pictures that follow the RAP picture in both decoding order and in display order.

Figure 5:
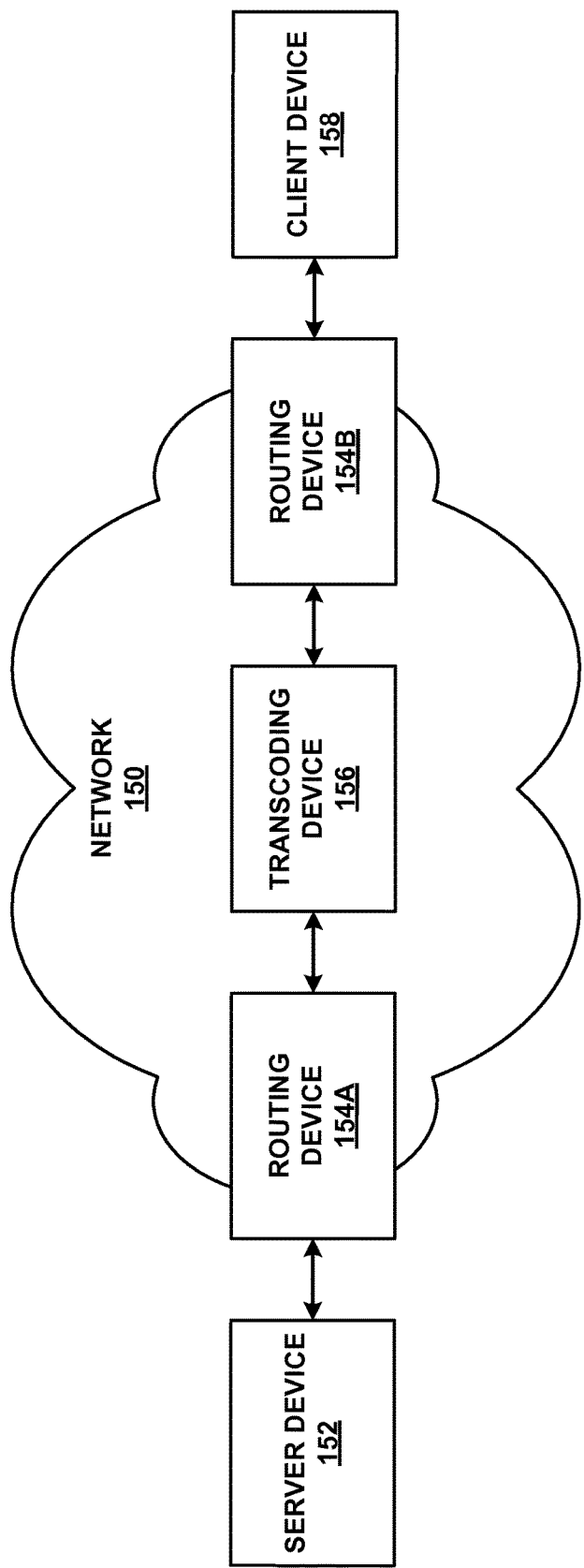
FIG. 5 is a block diagram illustrating an example set of devices that form part of a network.

FIG. 5 is a block diagram illustrating an example set of devices that form part of network 150. In this example, network 150 includes routing devices 154A, 154B (routing devices 154) and transcoding device 156. Routing devices 154 and transcoding device 156 are intended to represent a small number of devices that may form part of network 150. Other network devices, such as switches, hubs, gateways, firewalls, bridges, and other such devices may also be included within network 150. Moreover, additional network devices may be provided along a network path between server device 152 and client device 158. Server device 152 may correspond to source device 12 (FIG. 1), while client device 158 may correspond to destination device 14 (FIG. 1), in some examples.

In general, routing devices 154 implement one or more routing protocols to exchange network data through network 150. In general, routing devices 154 execute routing protocols to discover routes through network 150. By executing such routing protocols, routing device 154B may discover a network route from itself to server device 152 via routing device 154A.

Figure 6:
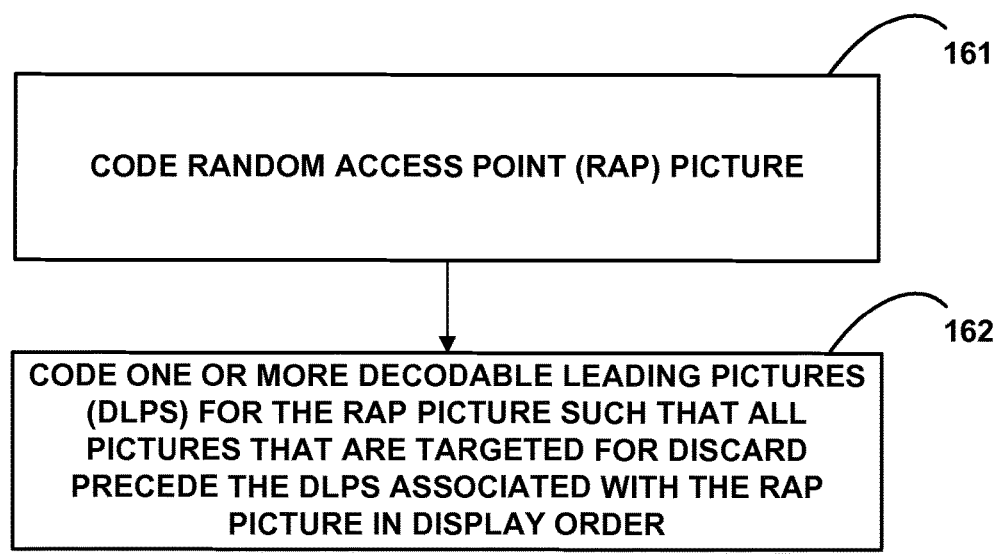
FIG. 6 is a flowchart illustrating an example operation for coding random access point (RAP) pictures according to techniques of this disclosure.

FIG. 6 is a flowchart illustrating an example technique of this disclosure. The techniques of FIG. 6 will be described with reference to a generic video coder. This generic video coder may, for example, correspond to either of video encoder 20 or video decoder 30. The video coder codes a RAP picture (161). The RAP picture can include one of a clean random access picture and a broken link access picture. The video coder codes one or more DLPs for the RAP picture such that all pictures that are targeted for discard precede the DLPs associated with the RAP picture in display order (162). The DLPs can include one or more pictures having display order values earlier than a display order value of the RAP picture and that do not refer to video data earlier than the RAP picture in decoding order.

Figure 7:
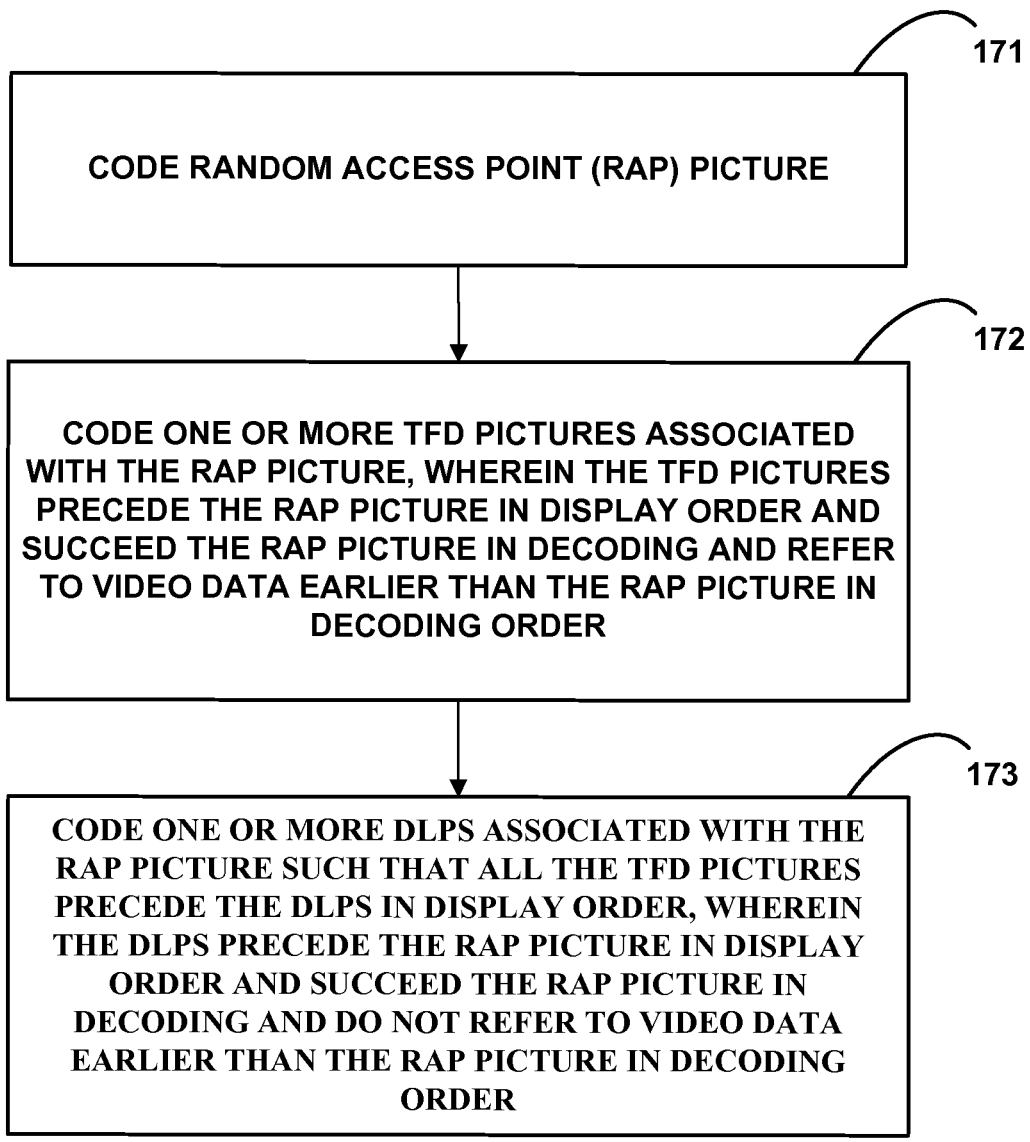
FIG. 7 is a flowchart illustrating an example operation for coding RAP pictures according to techniques of this disclosure.

FIG. 7 is a flowchart illustrating an example technique of this disclosure. The techniques of FIG. 7 will be described with reference to a generic video coder. This generic video coder may, for example, correspond to either of video encoder 20 or video decoder 30. The video coder codes a RAP picture (171). The video coder codes one or more TFD pictures associated with the RAP picture, wherein the TFD pictures precede the RAP picture in display order and succeed the RAP picture in decoding order and refer to video data earlier than the RAP picture in decoding order (172). The video coder codes one or more DLPs associated with the RAP picture such that all the TFD pictures precede the DLPs in display order, wherein the DLPs precede the RAP picture in display order and succeed the RAP picture in decoding order and do not refer to video data earlier than the RAP picture in decoding order (173).

Figure 8:
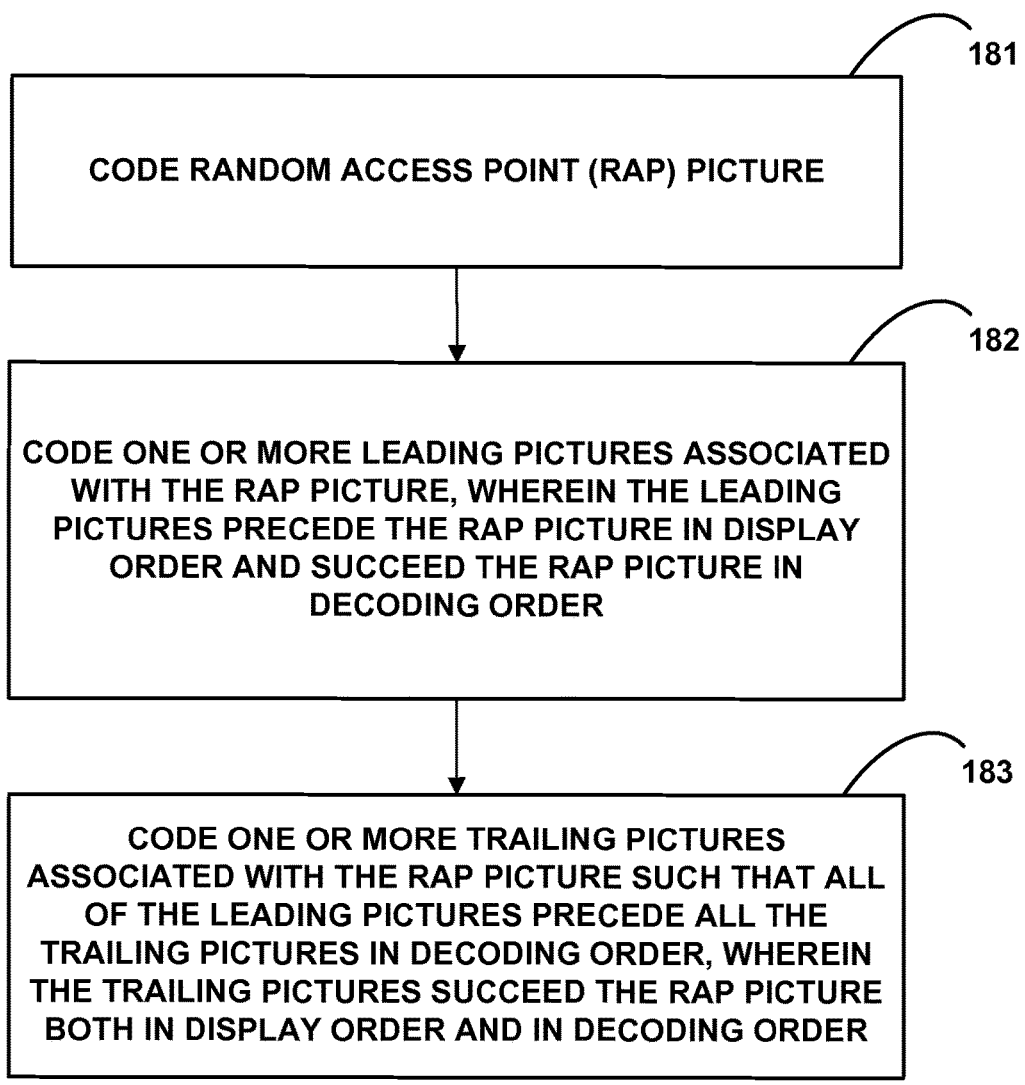
FIG. 8 is a flowchart illustrating an example operation for coding RAP pictures according to techniques of this disclosure.

FIG. 8 is a flowchart illustrating an example technique of this disclosure. The techniques of FIG. 8 will be described with reference to a generic video coder. This generic video coder may, for example, correspond to either of video encoder 20 or video decoder 30. The video coder codes a RAP picture (181). The video coder codes one or more leading pictures associated with the RAP picture where the leading pictures precede the RAP picture in display order and succeed the RAP picture in decoding order (182). The video coder codes one or more trailing pictures associated with the RAP picture such that all of the leading pictures precede all the trailing pictures in decoding order, wherein the trailing pictures succeed the RAP picture both in display order and in decoding order (183).

Figure 9:
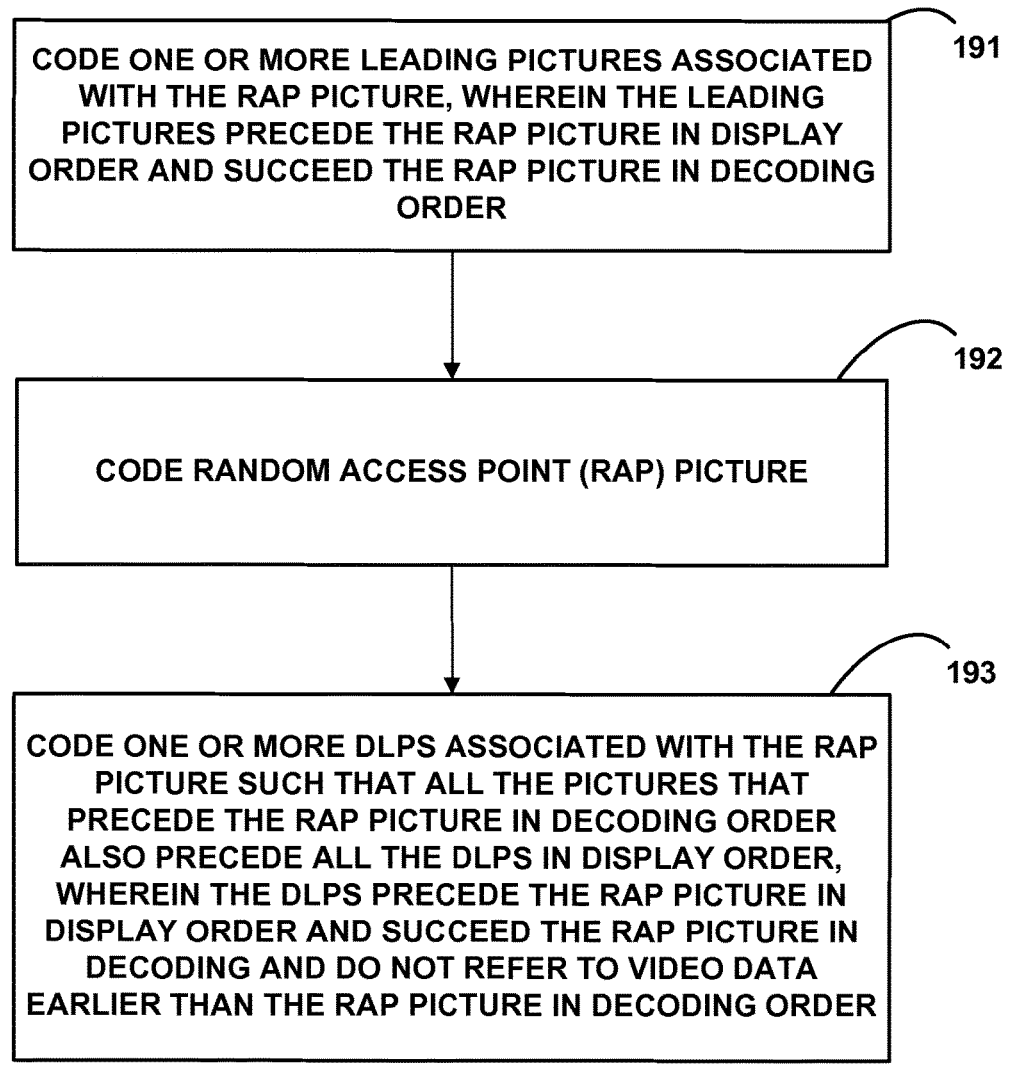
FIG. 9 is a flowchart illustrating an example operation for coding RAP pictures according to techniques of this disclosure.

FIG. 9 is a flowchart illustrating an example technique of this disclosure. The techniques of FIG. 9 will be described with reference to a generic video coder. This generic video coder may, for example, correspond to either of video encoder 20 or video decoder 30. The video codes one or more pictures that precede a RAP picture in decoding order (191). The video coder codes the RAP picture (192). The video coder codes one or more DLPs associated with the RAP picture such that all the pictures that precede the RAP picture in decoding order also precede all the DLPs in display order where the DLPs precede the RAP picture in display order and succeed the RAP picture in decoding order and do not refer to video data earlier than the RAP picture in decoding order (193).

Figure 10:
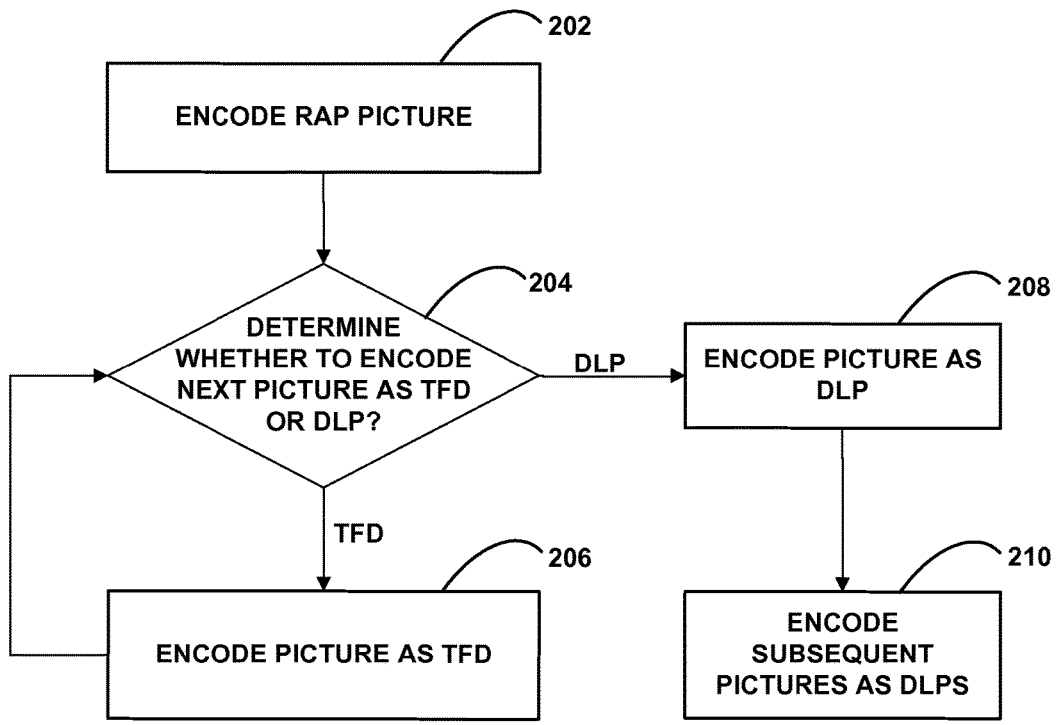
FIG. 10 is a flowchart illustrating an example operation for coding RAP pictures according to techniques of this disclosure.

FIG. 10 is a flowchart illustrating an example technique of this disclosure. The techniques of FIG. 10 may, for example, be performed by mode select unit 40 of video encoder 20. Mode select unit 40 may encode a RAP picture (202). For a next picture, following the RAP picture, mode select unit 40 may determine whether to code the next picture as a TFD or a DLP (204). If mode select unit 40 encodes the next picture a TFD (206), then for a subsequent picture, mode select unit 40 may once again determine whether to code the picture as a TFD or a DLP (204). Once mode select unit 40 codes a picture following a RAP picture as a DLP (208), then mode select unit encodes subsequent pictures as DLPs (210). In the example of FIG. 10, "next picture" generally refers to a picture that is subsequent in output order. The decoding order interleaving of DLPs and TFDs is still allowed, while output order interleaving may be disallowed.

Figure 11:
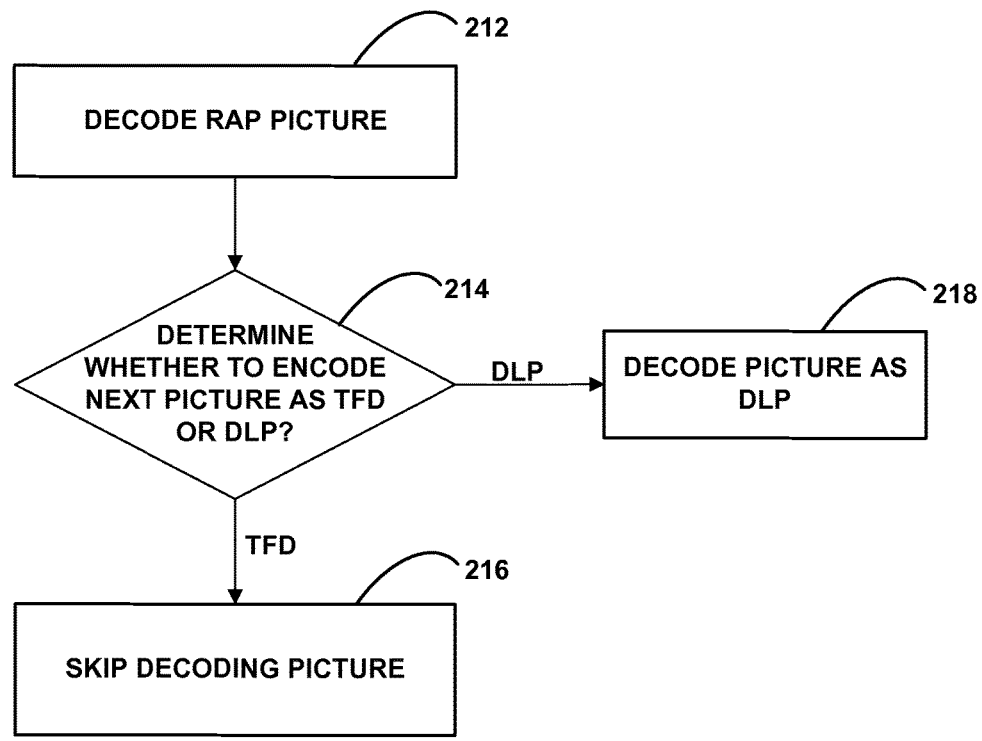
FIG. 11 is a flowchart illustrating an example operation for coding RAP pictures according to techniques of this disclosure.

FIG. 11 is a flowchart illustrating an example technique of this disclosure. The techniques of FIG. 11 may, for example, be performed by video decoder 30. Video decoder 30 may decode a RAP picture and determine the picture is to be used for random access to a bitstream. For the next picture in the bitstream, video decoder 30 may determine, for example, based on a NAL unit type for the picture, whether the picture is a TFD picture or a DLP (214). If the picture is a TFD, then video decoder 30 may skip decoding of the TFD picture (216). If the picture is a DLP, then video decoder 30 may decode the DLP (218).

Although the techniques of FIGS. 6, 7, 8, 9, 10, and 11 have been presented separately, it is contemplated that aspects of the techniques presented in FIGS. 6, 7, 8, 9, 10 and 11 may be implemented concurrently. It is to also be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, by a video decoding device comprising one or more processors, a random access point (RAP) picture, wherein the RAP picture comprises one of a clean random access (CRA) picture or a broken link access (BLA) picture;
    identifying, by the video decoding device comprising the one or more processors, one or more pictures of a first type associated with the RAP picture, wherein the one or more pictures of the first type precede the RAP picture in output order value and succeed the RAP picture in decoding order and refer to video data earlier than the RAP picture in the decoding order;
    discarding the one or more pictures of the first type;
    decoding, by the video decoding device comprising the one or more processors, one or more decodable leading pictures for the RAP picture in accordance with a restriction that causes a specified condition to be true, the specified condition requiring that all of the one or more pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
    outputting, by the video decoding device comprising the one or more processors, the decoded RAP picture.

2. The method of claim 1, further comprising decoding, by the video decoding device comprising one or more processors, one or more leading pictures relative to the RAP picture in accordance with a restriction that all of the leading pictures for the RAP picture precede all trailing pictures for the RAP picture in decoding order, wherein the trailing pictures comprise pictures having output order values that are greater than an output order value of the RAP picture.

3. The method of claim 1, wherein any picture preceding the CRA picture or the BLA picture in decoding order precedes any decodable leading picture associated with the CRA picture or the BLA picture in output order.

4. The method of claim 1, the method further comprising:
    decoding, by the video decoding device comprising one or more processors, one or more leading pictures associated with the RAP picture, wherein the leading pictures precede the RAP picture in output order value and succeed the RAP picture in decoding order; and
    decoding, by the video decoding device comprising one or more processors, one or more trailing pictures associated with the RAP picture in accordance with a restriction that all of the leading pictures precede all the trailing pictures in decoding order, wherein the trailing pictures succeed the RAP picture both in output order value and in decoding order.

5. The method of claim 1, wherein decoding the one or more decodable leading pictures for the RAP picture comprises decoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

6. The method of claim 1, the method further comprising:
decoding, by the video decoding device comprising one or more processors, one or more pictures that precede the RAP picture in a decoding order; and
wherein decoding the one or more decodable leading pictures comprises decoding the one or more decodable leading pictures associated with the RAP picture in accordance with a restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

7. The method of claim 1, wherein decoding the RAP picture is performed as part of a video encoding process.

8. A device for decoding video data, the device comprising:
a memory configured to store the video data;
a video decoder comprising one or more processors configured to:
decode a random access point (RAP) picture, wherein the RAP picture comprises one of a clean random access (CRA) picture or a broken link access (BLA) picture;
identify one or more pictures of a first type associated with the RAP picture, wherein the one or more pictures of the first type precede the RAP picture in output order value and succeed the RAP picture in decoding order and refer to video data earlier than the RAP picture in the decoding order;
discard the one or more pictures of the first type;
decode one or more decodable leading pictures for the RAP picture in accordance with a restriction that causes a specified condition to be true, the specified condition requiring that all of the one or more pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
output the decoded RAP picture.

9. The device of claim 8, wherein the video decoder is further configured to decode one or more leading pictures relative to the RAP picture in accordance with a restriction that all of the leading pictures for the RAP picture precede all trailing pictures for the RAP picture in decoding order, wherein the trailing pictures comprise pictures having output order values that are greater than a output order value of the RAP picture.

10. The device of claim 8, wherein any picture preceding the CRA picture or the BLA picture in decoding order precedes any decodable leading picture associated with the CRA picture or the BLA picture in output order.

11. The device of claim 8, wherein the video decoder is further configured to decode one or more leading pictures associated with the RAP picture, wherein the leading pictures precede the RAP picture in output order value and succeed the RAP picture in decoding order; and decode one or more trailing pictures associated with the RAP picture in accordance with a restriction that all of the leading pictures precede all the trailing pictures in decoding order, wherein the trailing pictures succeed the RAP picture both in output order value and in decoding order.

12. The device of claim 8, wherein the video decoder is configured to decode the one or more decodable leading pictures for the RAP picture by decoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

13. The device of claim 8, wherein the video decoder is further configured to decode one or more pictures that precede the RAP picture in a decoding order; and wherein the video decoder is configured to decode the one or more decodable leading pictures by decoding the one or more decodable leading pictures associated with the RAP picture in accordance with the restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

14. The device of claim 8, wherein the device comprises at least one of:
an integrated circuit;
a microprocessor; or
a wireless communication device that includes the video decoder.

15. An apparatus for decoding video data, the apparatus comprising:
means for decoding a random access point (RAP) picture, wherein the RAP picture comprises one of a clean random access (CRA) picture or a broken link access (BLA) picture;
means for identifying one or more pictures of a first type associated with the RAP picture, wherein the one or more pictures of the first type precede the RAP picture in output order value and succeed the RAP picture in decoding order and refer to video data earlier than the RAP picture in the decoding order;
means for discard the one or more pictures of the first type;
means for decoding one or more decodable leading pictures for the RAP picture in accordance with a restriction that causes a specified condition to be true, the specified condition requiring that all of the one or more pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
means for outputting the decoded RAP picture.

16. The apparatus of claim 15, further comprising means for decoding one or more leading pictures relative to the RAP picture in accordance with a restriction that all of the leading pictures for the RAP picture precede all trailing pictures for the RAP picture in decoding order, wherein the trailing pictures comprise pictures having output order values that are greater than a output order value of the RAP picture.

17. The apparatus of claim 15, wherein any picture preceding the CRA picture or the BLA picture in decoding order precedes any decodable leading picture associated with the CRA picture or the BLA picture in output order.

18. The apparatus of claim 15, the apparatus further comprising:
   means for decoding one or more leading pictures associated with the RAP picture, wherein the leading pictures precede the RAP picture in output order value and succeed the RAP picture in decoding order; and
   means for decoding one or more trailing pictures associated with the RAP picture in accordance with a restriction that all of the leading pictures precede all the trailing pictures in decoding order, wherein the trailing pictures succeed the RAP picture both in output order value and in decoding order.

19. The apparatus of claim 15, wherein the means for decoding the one or more decodable leading pictures for the RAP picture comprises means for decoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

20. The apparatus of claim 15, the apparatus further comprising:
   means for decoding one or more pictures that precede the RAP picture in a decoding order; and
   wherein the means for decoding the one or more decodable leading pictures comprises means for decoding the one or more decodable leading pictures associated with the RAP picture in accordance with a restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

21. A non-transitory computer readable storage medium storing instructions that when executed by one or more processors cause the one or more processors to:
   decode a random access point (RAP) picture, wherein the RAP picture comprises one of a clean random access (CRA) picture or a broken link access (BLA) picture;
   identify one or more pictures of a first type associated with the RAP picture, wherein the one or more pictures of the first type precede the RAP picture in output order value and succeed the RAP picture in decoding order and refer to video data earlier than the RAP picture in the decoding order;
   discard the one or more pictures of the first type;
   decode one or more decodable leading pictures for the RAP picture in accordance with a restriction that causes a specified condition to be true, the specified condition requiring that all of the one or more pictures of the first type precede the one or more decodable leading pictures associated with the RAP picture in output play order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
   output the decoded RAP picture.

22. A method of encoding video data, the method comprising:
   encoding, by a video encoding device comprising one or more processors, a random access point (RAP) picture, wherein the RAP picture comprises one of a clean random access (CRA) picture or a broken link access (BLA) picture;
   encoding, by the video encoding device comprising the one or more processors, one or more pictures of a first type associated with the RAP picture, wherein the one or more pictures of the first type precede the RAP picture in output order value and succeed the RAP picture in decoding order and refer to video data earlier than the RAP picture in the decoding order;
   encoding, by the video encoding device comprising the one or more processors, one or more decodable leading pictures for the RAP picture in accordance with a restriction that causes a specified condition to be true, the specified condition requiring that all pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
   outputting, by the video encoding device comprising the one or more processors, the RAP picture.

23. The method of claim 22, further comprising encoding one or more leading pictures relative to the RAP picture in accordance with a restriction that all of the leading pictures for the RAP picture precede all trailing pictures for the RAP picture in decoding order, wherein the trailing pictures comprise pictures having output order values that are greater than a output order value of the RAP picture.

24. The method of claim 22, wherein any picture preceding the CRA picture or the BLA picture in decoding order precedes any decodable leading picture associated with the CRA picture or the BLA picture in output order.

25. The method of claim 22, the method further comprising:
   encoding, by the video encoding device comprising the one or more processors, one or more leading pictures associated with the RAP picture, wherein the leading pictures precede the RAP picture in output order value and succeed the RAP picture in decoding order; and
   encoding, by the video encoding device comprising the one or more processors, one or more trailing pictures associated with the RAP picture in accordance with a restriction that all of the leading pictures precede all the trailing pictures in decoding order, wherein the trailing pictures succeed the RAP picture both in output order value and in decoding order.

26. The method of claim 21, wherein encoding the one or more decodable leading pictures for the RAP picture comprises encoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

27. The method of claim 22, the method further comprising:
encoding, by the video encoding device comprising the one or more processors, one or more pictures that precede the RAP picture in a decoding order; and
wherein encoding the one or more decodable leading pictures comprises encoding the one or more decodable leading pictures associated with the RAP picture in accordance with a restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

28. The method of claim 22, wherein encoding the RAP picture is performed as part of a video encoding process.

29. A device for encoding video data, the device comprising:
a memory configured to store the video data;
a video encoder comprising one or more processors configured to:
encode a random access point (RAP) picture, wherein the RAP picture comprises one of a clean random access (CRA) picture or a broken link access (BLA) picture;
encode one or more pictures of a first type associated with the RAP picture, wherein the one or more pictures of the first type precede the RAP picture in output order value and succeed the RAP picture in decoding order and refer to video data earlier than the RAP picture in the decoding order;
encode one or more decodable leading pictures for the RAP picture in accordance with a restriction that causes a specified condition to be true, the specified condition requiring that all pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
output the RAP picture.

30. The device of claim 29, wherein the video encoder is further configured to encode one or more leading pictures relative to the RAP picture in accordance with a restriction that all of the leading pictures for the RAP picture precede all trailing pictures for the RAP picture in decoding order, wherein the trailing pictures comprise pictures having output order values that are greater than a output order value of the RAP picture.

31. The device of claim 29, wherein any picture preceding the CRA picture or the BLA picture in decoding order precedes any decodable leading picture associated with the CRA picture or the BLA picture in output order.

32. The device of claim 29, wherein the video encoder is further configured to encode one or more leading pictures associated with the RAP picture, wherein the leading pictures precede the RAP picture in output order value and succeed the RAP picture in decoding order; and encode one or more trailing pictures associated with the RAP picture in accordance with a restriction that all of the leading pictures precede all the trailing pictures in decoding order, wherein the trailing pictures succeed the RAP picture both in output order value and in decoding order.

33. The device of claim 29, wherein the video encoder is configured to encode the one or more decodable leading pictures for the RAP picture comprises encoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

34. The device of claim 29, wherein the video encoder is further configured to encode one or more pictures that precede the RAP picture in a decoding order; and wherein the video encoder is configured to encode the one or more decodable leading pictures by encoding the one or more decodable leading pictures associated with the RAP picture in accordance with a restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

35. The device of claim 29, wherein the device comprises at least one of:
an integrated circuit;
a microprocessor; or
a wireless communication device that includes the video encoder.

36. An apparatus for encoding video data, the apparatus comprising:
means for encoding a random access point (RAP) picture, wherein the RAP picture comprises one of a clean random access (CRA) picture or a broken link access (BLA) picture;
means for encoding one or more pictures of a first type associated with the RAP picture, wherein the one or more pictures of the first type precede the RAP picture in output order value and succeed the RAP picture in decoding order and refer to video data earlier than the RAP picture in the decoding order;
means for encoding one or more decodable leading pictures for the RAP picture in accordance with a restriction that causes a specified condition to be true, the specified condition requiring that all pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
outputting, by the video encoding device comprising the one or more processors, the RAP picture.

37. The apparatus of claim 36, further comprising means for encoding one or more leading pictures relative to the RAP picture in accordance with a restriction that all of the leading pictures for the RAP picture precede all trailing pictures for the RAP picture in decoding order, wherein the trailing pictures comprise pictures having output order values that are greater than a output order value of the RAP picture.

38. The apparatus of claim 36, wherein any picture preceding the CRA picture or the BLA picture in decoding order precedes any decodable leading picture associated with the CRA picture or the BLA picture in output order.

39. The apparatus of claim 36, the apparatus further comprising:
   means for encoding one or more leading pictures associated with the RAP picture, wherein the leading pictures precede the RAP picture in output order value and succeed the RAP picture in decoding order; and
   means for encoding one or more trailing pictures associated with the RAP picture in accordance with a restriction that all of the leading pictures precede all the trailing pictures in decoding order, wherein the trailing pictures succeed the RAP picture both in output order value and in decoding order.

40. The apparatus of claim 36, wherein the means for encoding the one or more decodable leading pictures for the RAP picture comprises means for encoding the one or more decodable leading pictures associated with the RAP picture in accordance with the restriction that all the pictures of the first type precede the one or more decodable leading pictures in output order, wherein the one or more decodable leading pictures precede the RAP picture in output order and succeed the RAP picture in the decoding order and do not refer to video data earlier than the RAP picture in the decoding order.

41. The apparatus of claim 36, the apparatus further comprising:
   means for encoding one or more pictures that precede the RAP picture in a decoding order; and
   wherein the means for encoding the one or more decodable leading pictures comprises means for encoding the one or more decodable leading pictures associated with the RAP picture in accordance with a restriction that all pictures that precede the RAP picture in decoding order also precede all the one or more decodable leading pictures in output order, wherein the one or more decodable leading pictures precede the RAP picture in output order and succeed the RAP picture in decoding order and do not refer to video data earlier than the RAP picture in decoding order.

42. A non-transitory computer readable storage medium storing instructions that when executed by one or more processors cause the one or more processors to:
   encode a random access point (RAP) picture, wherein the RAP picture comprises one of a clean random access (CRA) picture or a broken link access (BLA) picture;
   encode one or more pictures of a first type associated with the RAP picture, wherein the one or more pictures of the first type precede the RAP picture in output order value and succeed the RAP picture in decoding order and refer to video data earlier than the RAP picture in the decoding order;
   encode one or more decodable leading pictures for the RAP picture in accordance with a restriction that causes a specified condition to be true, the specified condition requiring that all pictures of the first type precede the one or more decodable leading pictures associated with the RAP picture in output order, wherein the one or more decodable leading pictures comprise one or more pictures having output order values that indicate an output order earlier than an output order value of the RAP picture, and wherein the one or more decodable leading pictures are decoded after decoding the RAP picture, and wherein the one or more decodable leading pictures do not refer to video data earlier than the RAP picture in decoding order; and
   output the RAP picture.

43. The method of claim 1, wherein the one or more pictures of the first type comprise one or more random access skipped leading pictures.

44. The method of claim 1, wherein the one or more decodable leading pictures comprise one or more random access decodable leading pictures.

45. The method of claim 1, wherein the one or more pictures of the first type comprise one or more pictures that depend on data from one or more pictures occurring earlier, in decoding order, than the RAP picture.

46. The device of claim 8, wherein the one or more pictures of the first type comprise one or more random access skipped leading pictures.

47. The device of claim 8, wherein the one or more decodable leading pictures comprise one or more random access decodable leading pictures.

48. The device of claim 8, wherein the one or more pictures of the first type comprise one or more pictures that depend on data from one or more pictures occurring earlier, in decoding order, than the RAP picture.

49. The method of claim 22, wherein the one or more pictures of the first type comprise one or more random access skipped leading pictures.

50. The method of claim 22, wherein the one or more decodable leading pictures comprise one or more random access decodable leading pictures.

51. The method of claim 22, wherein the one or more pictures of the first type comprise one or more pictures that depend on data from one or more pictures occurring earlier, in decoding order, than the RAP picture.

52. The device of claim 29, wherein the one or more pictures of the first type comprise one or more random access skipped leading pictures.

53. The device of claim 29, wherein the one or more decodable leading pictures comprise one or more random access decodable leading pictures.

54. The device of claim 29, wherein the one or more pictures of the first type comprise one or more pictures that depend on data from one or more pictures occurring earlier, in decoding order, than the RAP picture.

55. The apparatus of claim 36, wherein the one or more pictures of the first type comprise one or more random access skipped leading pictures.

56. The apparatus of claim 36, wherein the one or more decodable leading pictures comprise one or more random access decodable leading pictures.

57. The apparatus of claim 36, wherein the one or more pictures of the first type comprise one or more pictures that depend on data from one or more pictures occurring earlier, in decoding order, than the RAP picture.

* * * * *

UNITED STATES PATENT AND TRADEMARK OFFICE
CERTIFICATE OF CORRECTION

PATENT NO. : 9,591,303 B2
APPLICATION NO. : 13/784006
DATED : March 7, 2017
INVENTOR(S) : Adarsh Krishnan Ramasubramonian et al.

Page 1 of 1

It is certified that error appears in the above-identified patent and that said Letters Patent is hereby corrected as shown below:

In the Claims

Claim 26, Column 52, Line 63, "The method of claim 21," should be changed to
-- The method of claim 22, --

Signed and Sealed this
Ninth Day of October, 2018

Andrei Iancu
*Director of the United States Patent and Trademark Office*